United States Patent
Kim et al.

(10) Patent No.: US 12,010,684 B2
(45) Date of Patent: Jun. 11, 2024

(54) RESOURCE MAPPING METHOD FOR TRANSMISSION AND RECEPTION OF DATA IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Jiwon Kang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 17/290,595

(22) PCT Filed: Nov. 1, 2019

(86) PCT No.: PCT/KR2019/014768
§ 371 (c)(1),
(2) Date: Apr. 30, 2021

(87) PCT Pub. No.: WO2020/091539
PCT Pub. Date: May 7, 2020

(65) Prior Publication Data
US 2021/0360672 A1    Nov. 18, 2021

Related U.S. Application Data

(60) Provisional application No. 62/755,324, filed on Nov. 2, 2018.

(51) Int. Cl.
| | | |
|---|---|---|
| *H04W 72/20* | (2023.01) | |
| *H04W 72/0446* | (2023.01) | |
| *H04W 72/0453* | (2023.01) | |
| *H04W 72/1263* | (2023.01) | |

(52) U.S. Cl.
CPC ....... *H04W 72/20* (2023.01); *H04W 72/0446* (2013.01); *H04W 72/0453* (2013.01); *H04W 72/1263* (2013.01)

(58) Field of Classification Search
CPC ... H04W 72/21; H04W 72/23; H04W 72/231; H04W 72/232; H04W 72/20;
(Continued)

(56) References Cited

U.S. PATENT DOCUMENTS

| | | | |
|---|---|---|---|
| 2007/0211662 A1* | 9/2007 | Hyon | H04W 72/23 455/450 |
| 2010/0035621 A1* | 2/2010 | Chun | H04W 72/23 455/450 |

(Continued)

OTHER PUBLICATIONS

Apple, "Considerations on PDCCH design for NCJT," R1-1811124, 3GPP TSG RAN WG1 Meeting #94bis, Chengdu, China, Oct. 8-12, 2018, 6 pages.
(Continued)

*Primary Examiner* — Shailendra Kumar
(74) *Attorney, Agent, or Firm* — Fish & Richardson P.C.

(57) ABSTRACT

A method for receiving data by user equipment in a wireless communication system comprises: receiving first control information from a first apparatus and second control information from a second apparatus; obtaining resource allocation information by decoding the first control information and the second control information; and receiving the data from at least one of the first apparatus and the second apparatus, based on the resource allocation information, wherein the resource allocation information comprises information for resource regions comprising (i) a first resource region commonly allocated from the first apparatus and the second apparatus, and (ii) a second resource region allocated from one of the first apparatus and the second apparatus, and the data is mapped to at least one of the first resource region
(Continued)

and the second resource region, on the basis of a resource mapping order set according to a transmission unit of the data.

15 Claims, 17 Drawing Sheets

(58) Field of Classification Search
CPC ......... H04W 72/0446; H04W 72/0453; H04W 72/1263; H04L 5/0051; H04L 5/0055; H04L 5/0094; H04L 1/1671; H04L 1/1854; H04L 5/0048; H04L 5/0053; H04L 5/0035; H04L 1/00; H04L 5/0044; H04L 5/0073
See application file for complete search history.

(56) References Cited

U.S. PATENT DOCUMENTS

| | | | |
|---|---|---|---|
| 2014/0105158 A1 | 4/2014 | Kim et al. | |
| 2015/0195069 A1* | 7/2015 | Yi | H04L 5/0053 370/329 |
| 2017/0070984 A1* | 3/2017 | Lin | H04L 5/0053 |
| 2019/0356424 A1* | 11/2019 | Urabayashi | H04L 5/0082 |

OTHER PUBLICATIONS

AT&T, "Overview of Multi-TRP/Panel Enhancements," R1-1810682, 3GPP TSG RAN WG1 Meeting #94bis, Chengdu, China, Oct. 8-12, 2018, 23 pages.

CATT, "Consideration on multi-TRP/panel transmission for Rel-16," R1-1810555, 3GPP TSG RAN WG1 Meeting #94, Chengdu, China, Oct. 8-12, 2018, 10 pages.

Huawei, HiSilicon, "Enhancements on multi-TRP/panel transmission," R1-1810104, 3GPP TSG RAN WG1 Meeting #94bis, Chengdu, China, Oct. 8-12, 2018, 16 pages.

PCT International Search Report in International Appln. No. PCT/KR2019/014768, dated Feb. 19, 2020, 5 pages (with English translation).

* cited by examiner

[FIG. 1]
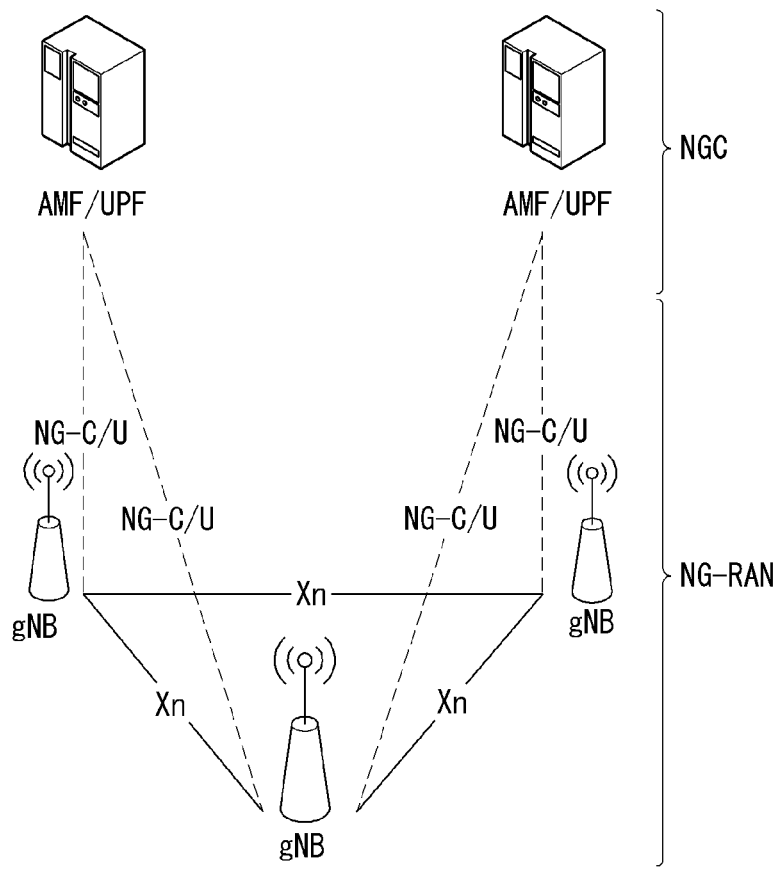
[FIG. 2]
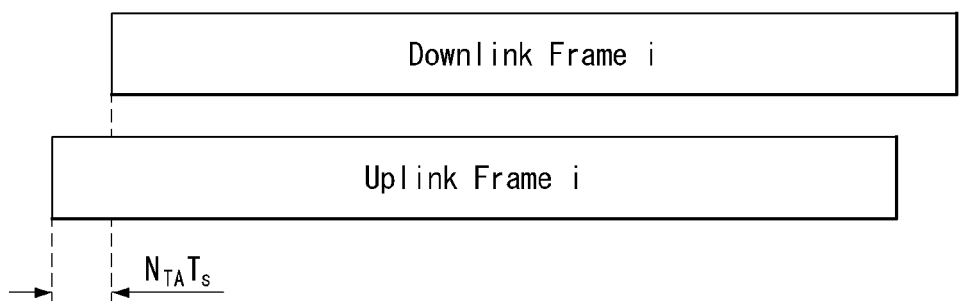

[FIG. 3]
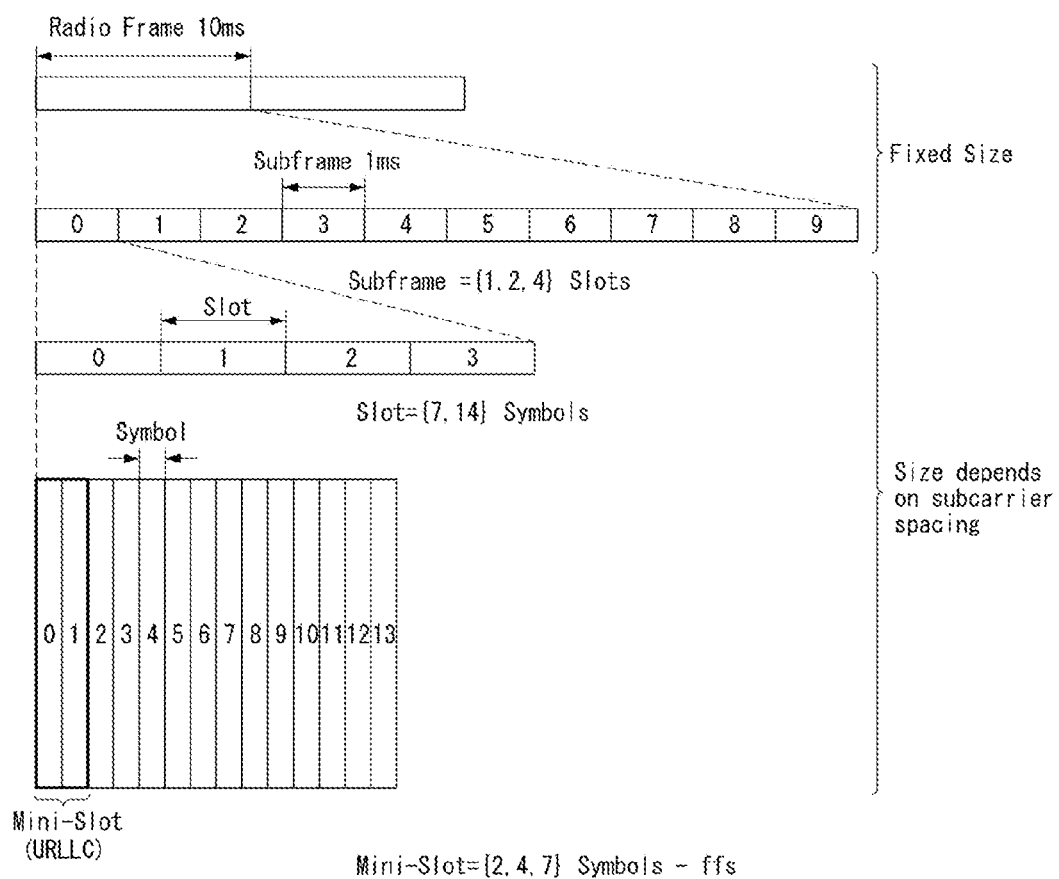

[FIG. 4]
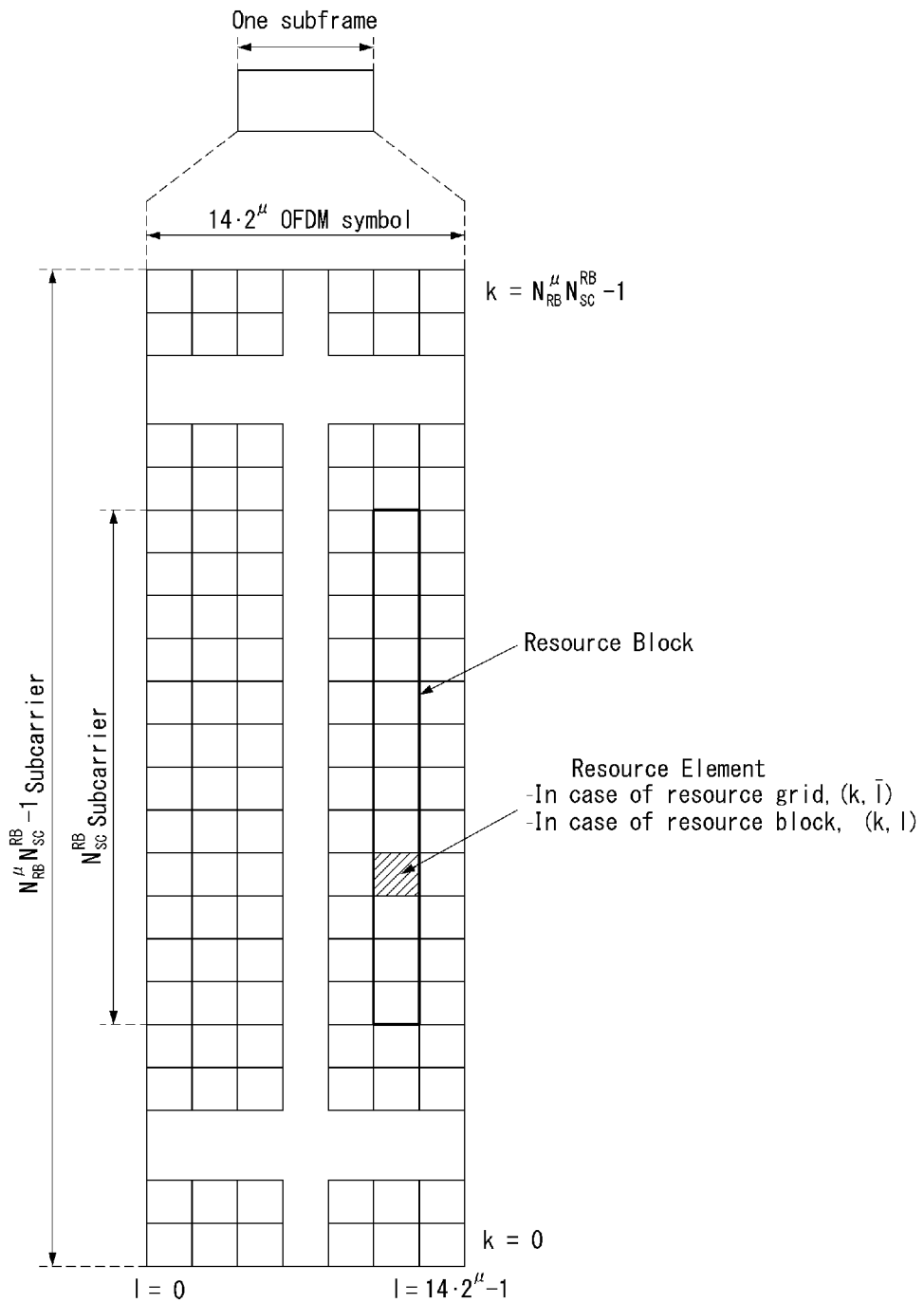

[FIG. 5]
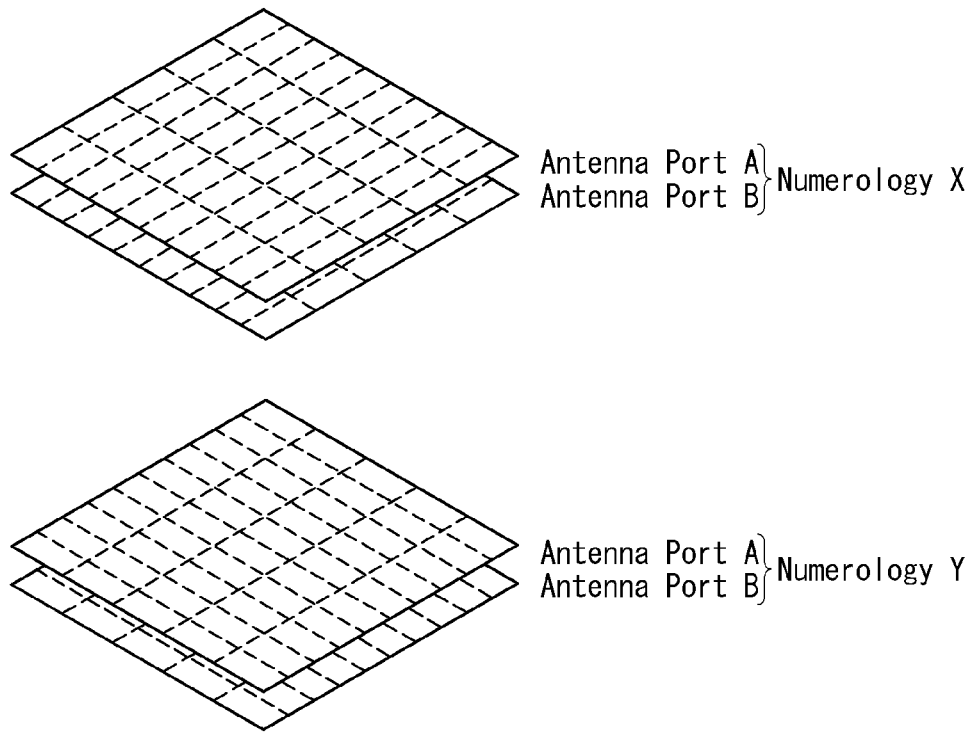
[FIG. 6]
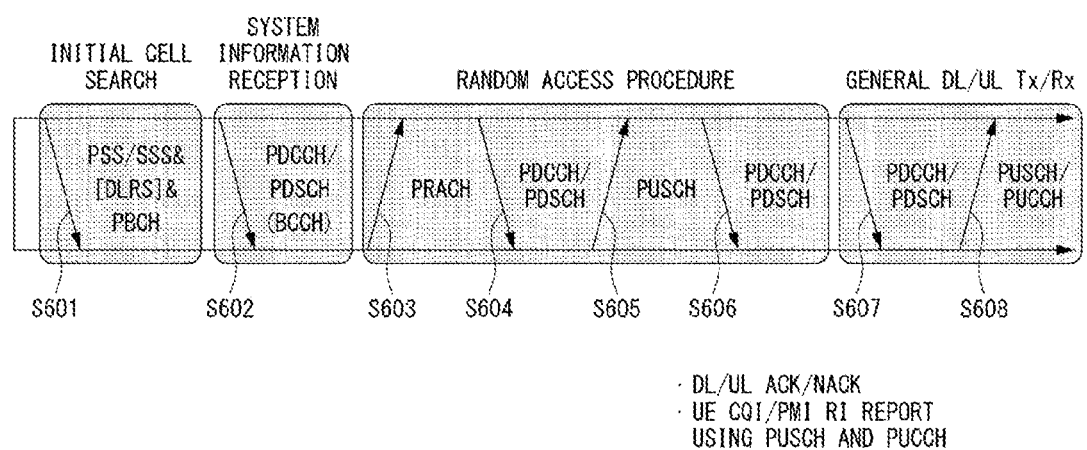

【FIG. 7】
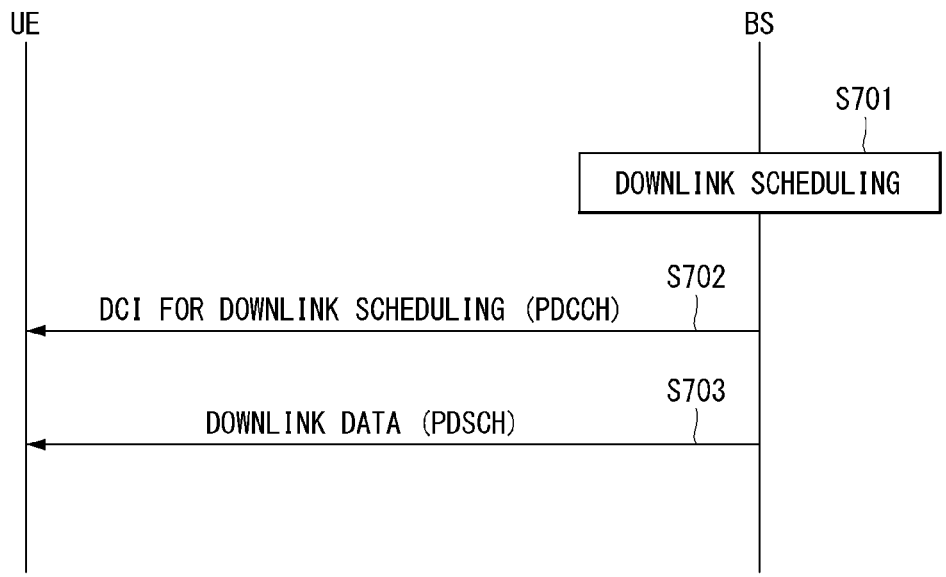
【FIG. 8】
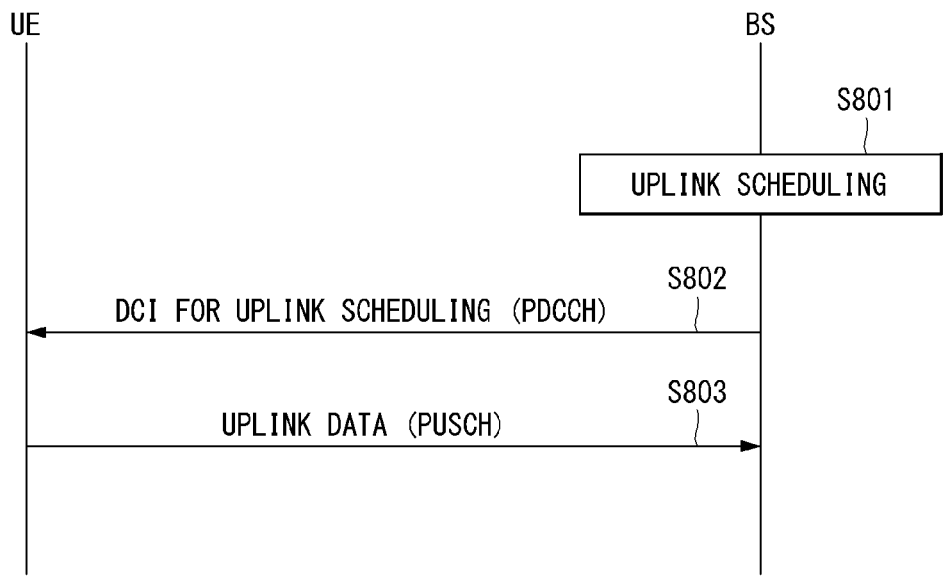

[FIG. 9]
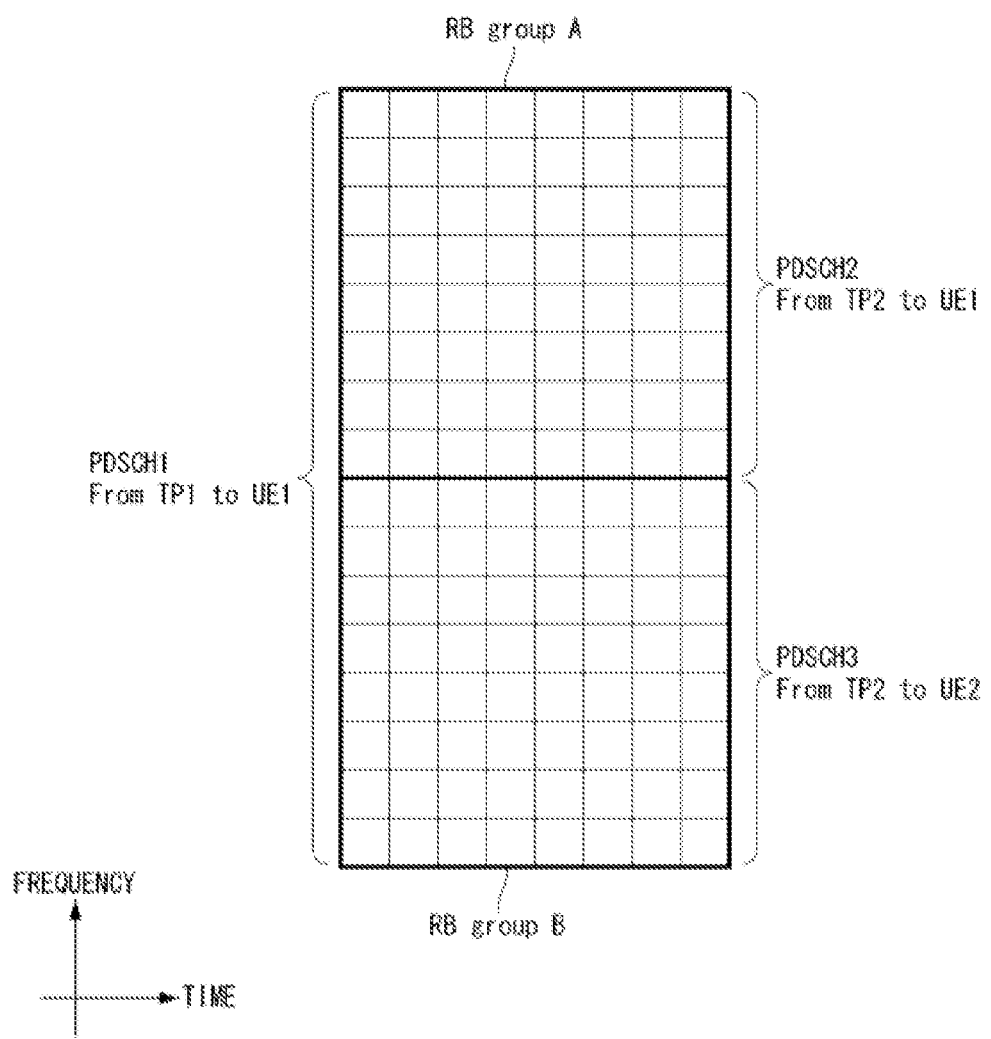

[FIG. 10]
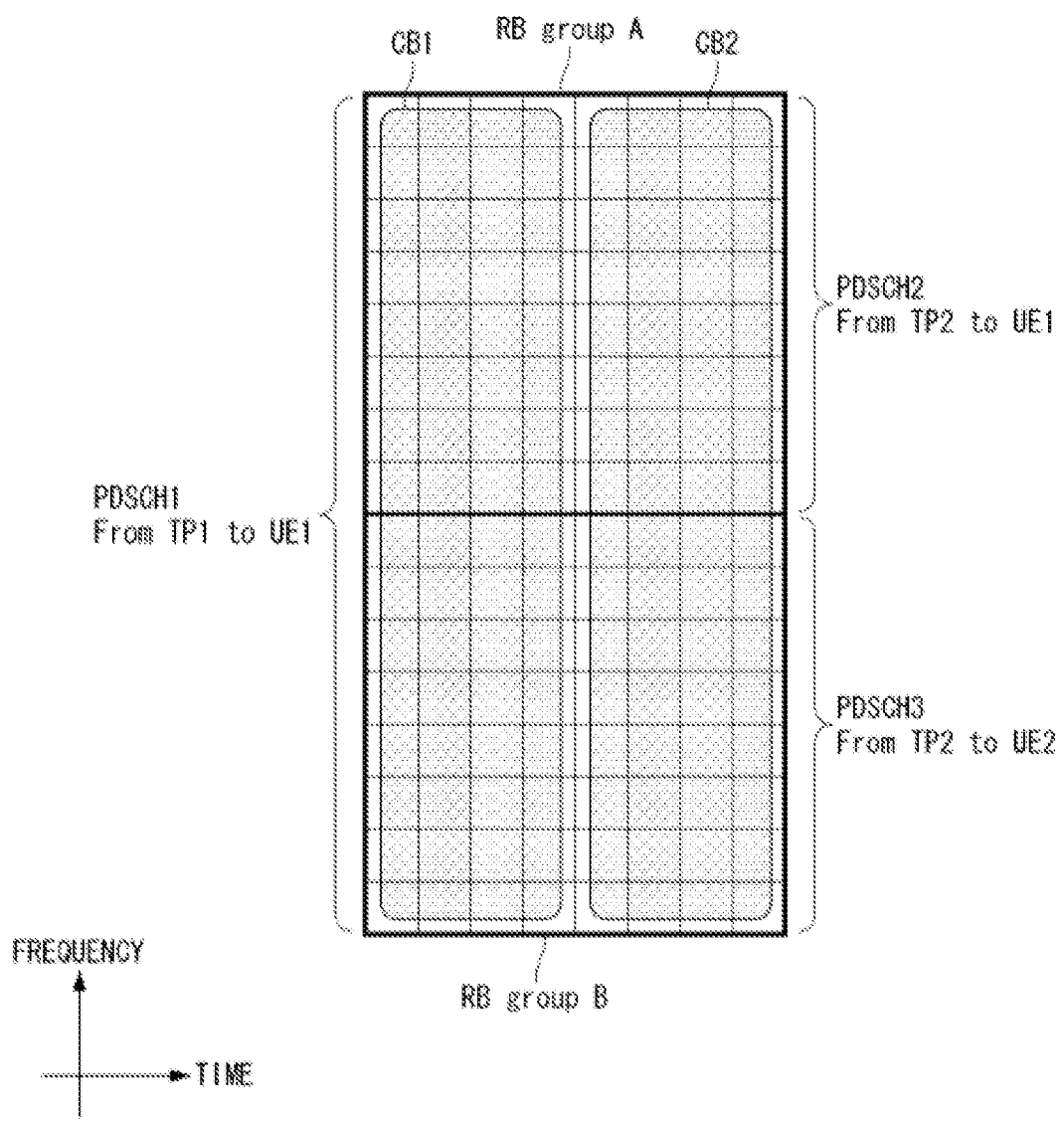

[FIG. 11]
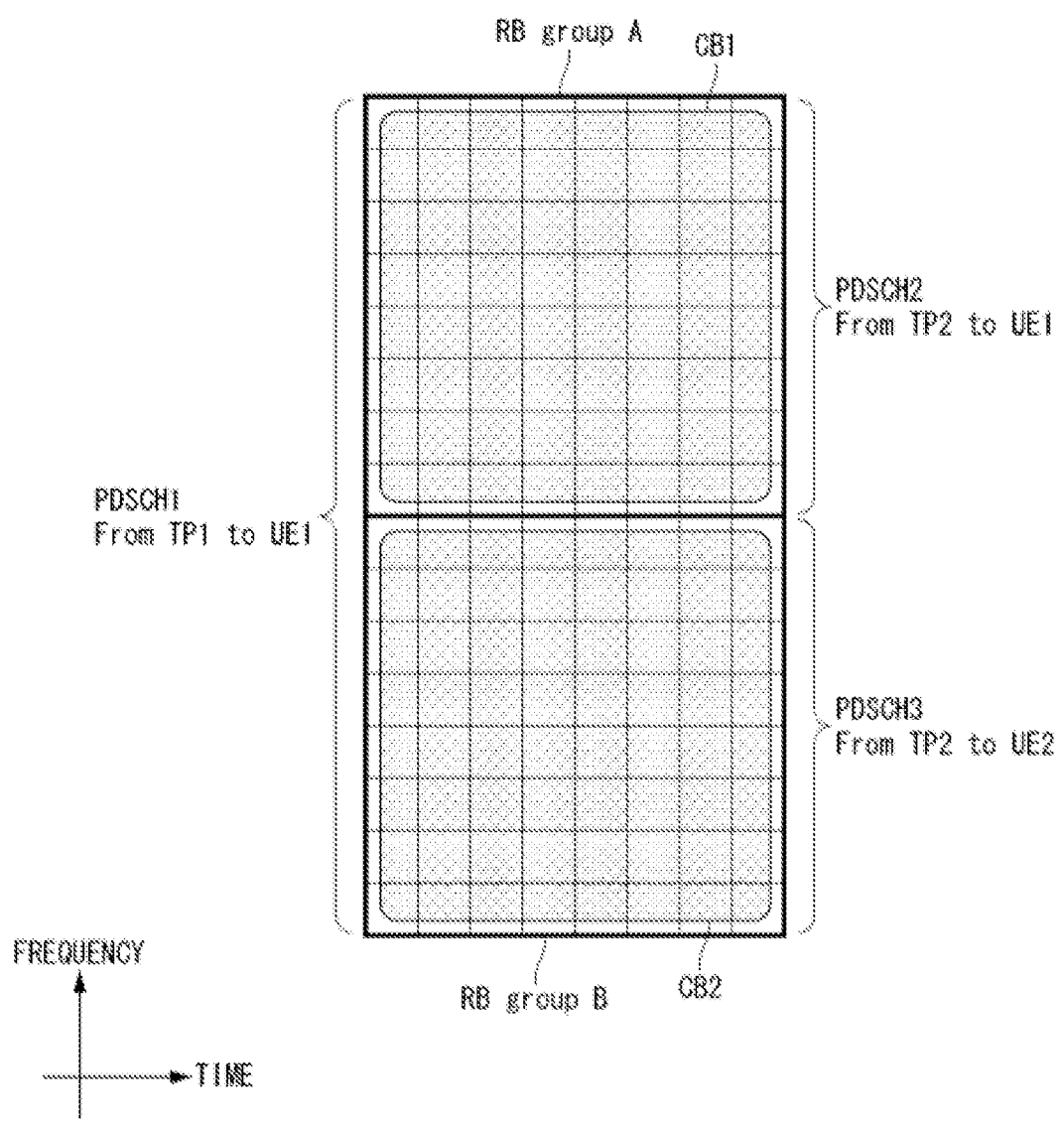

[FIG. 12]
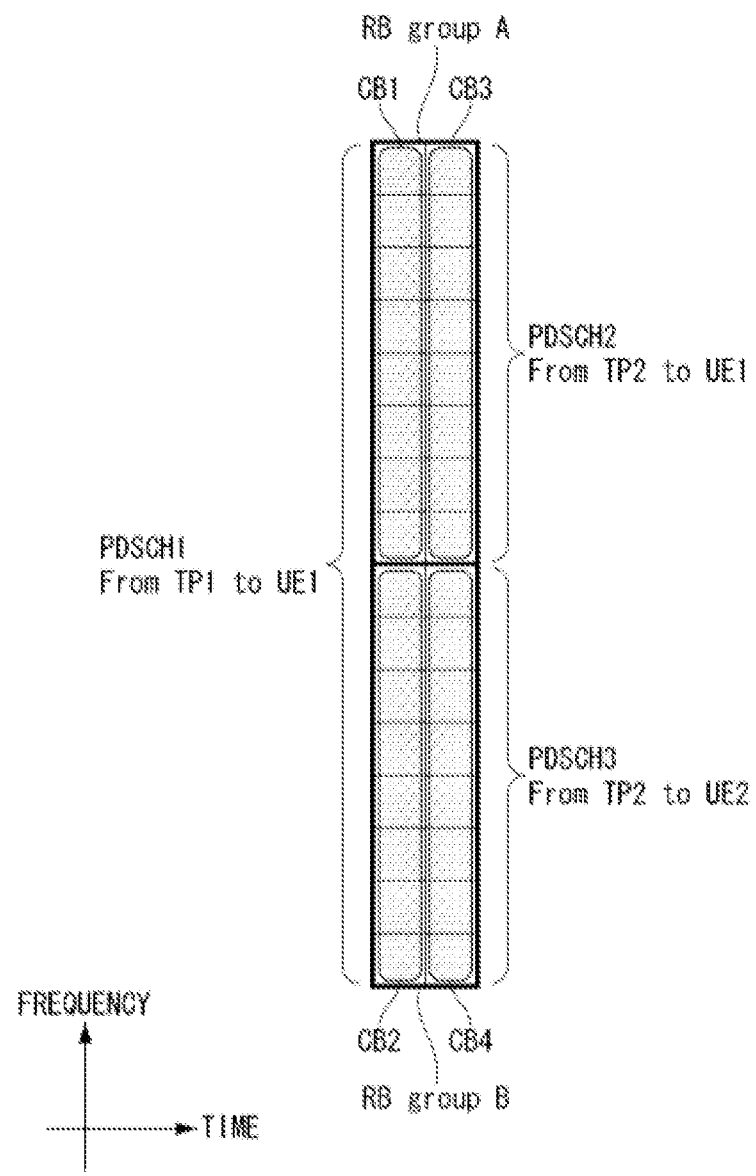

[FIG. 13]
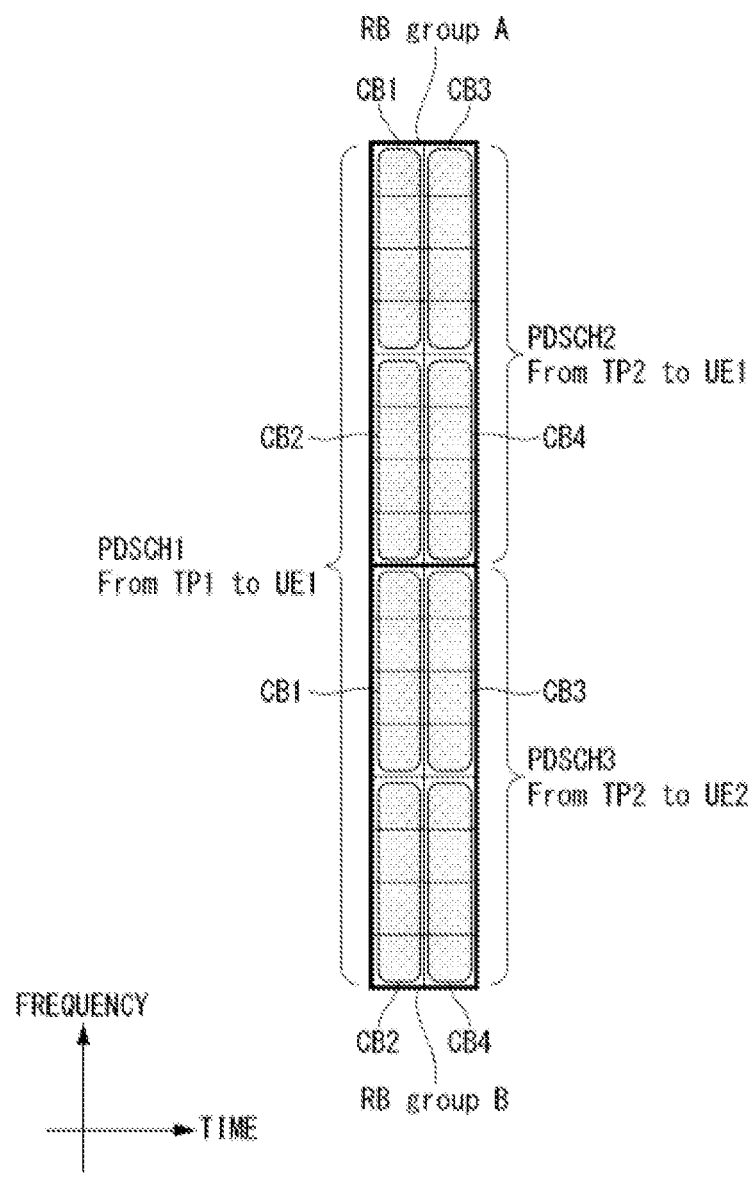

[FIG. 14]
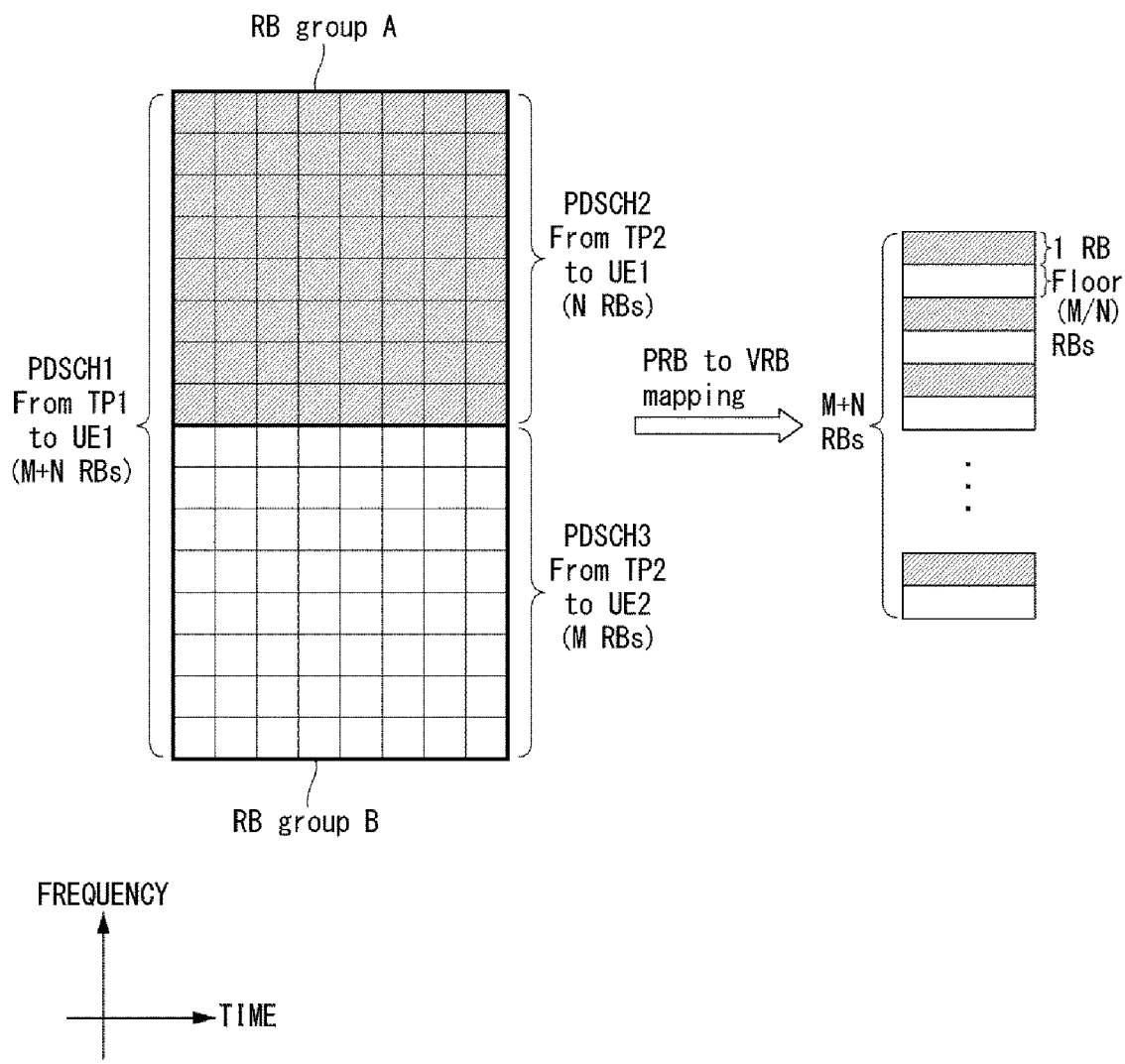

[FIG. 15]
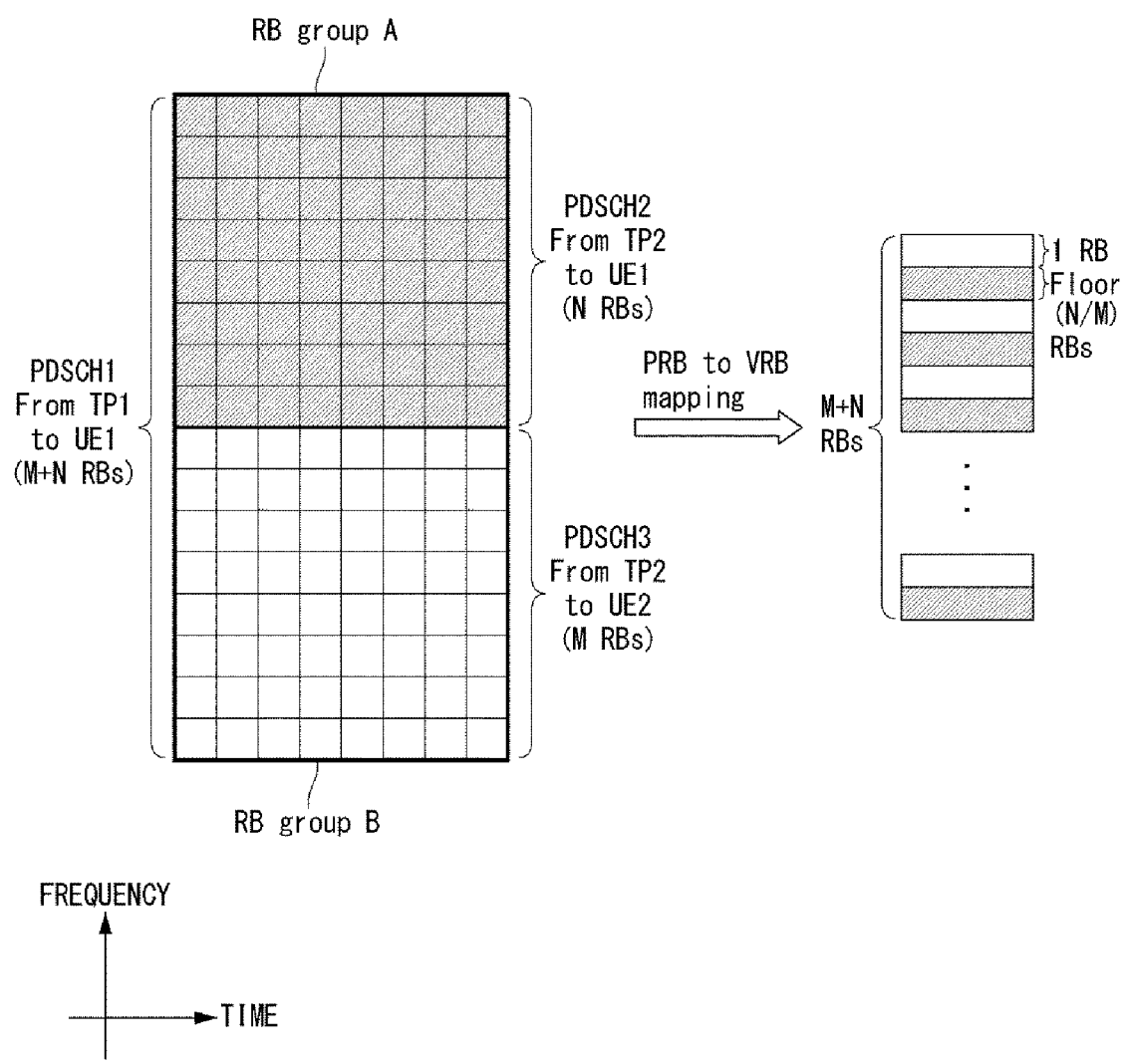

[FIG. 16]
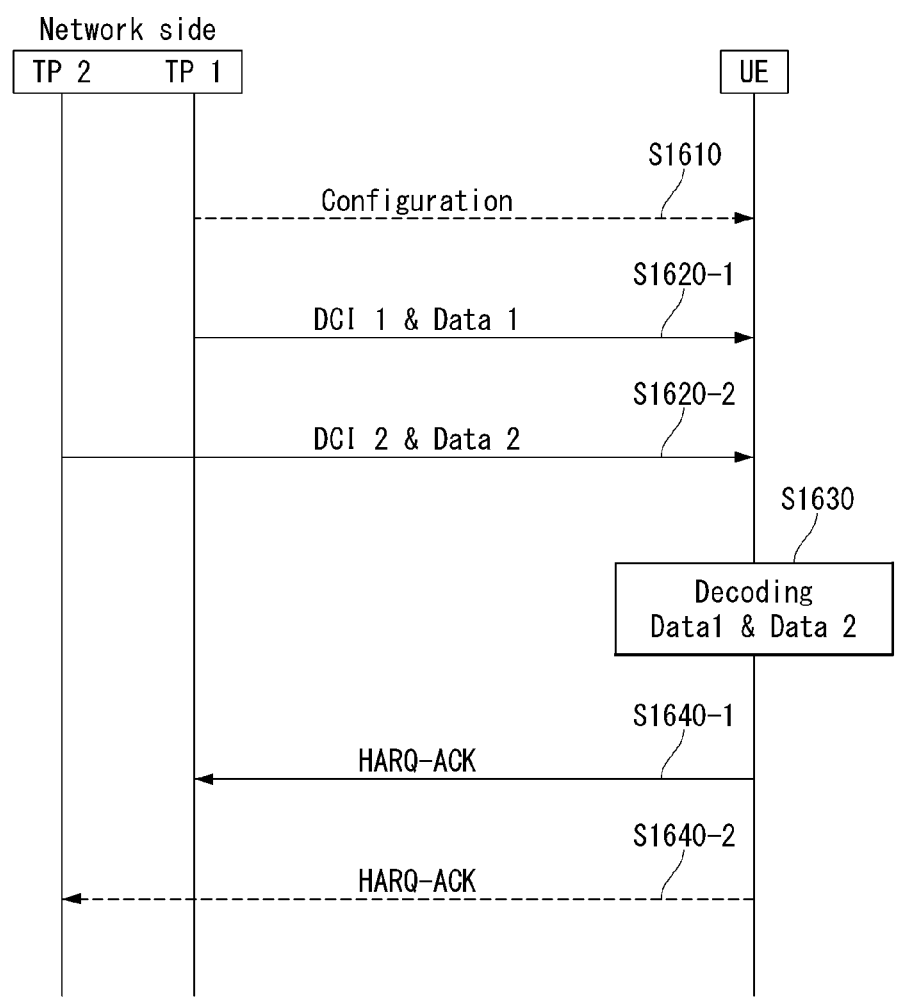

[FIG. 17]
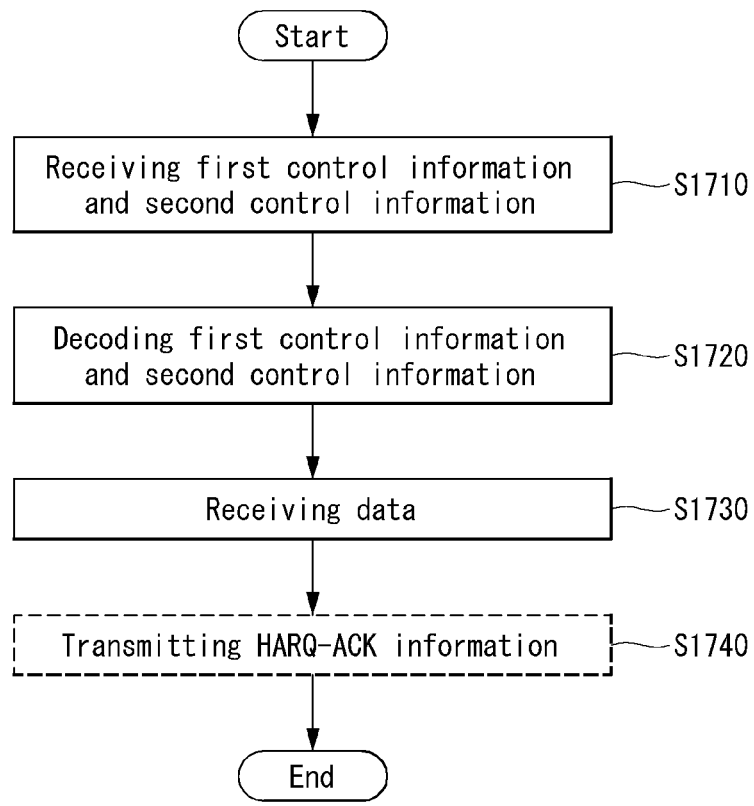

[FIG. 18]
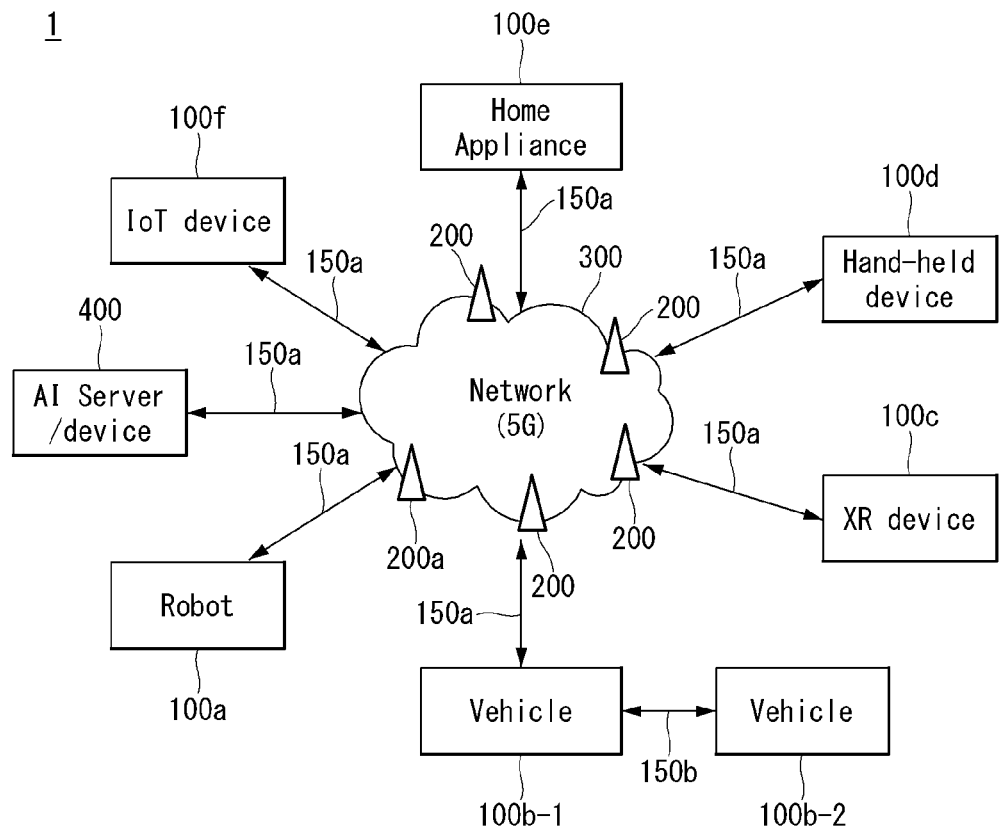
[FIG. 19]
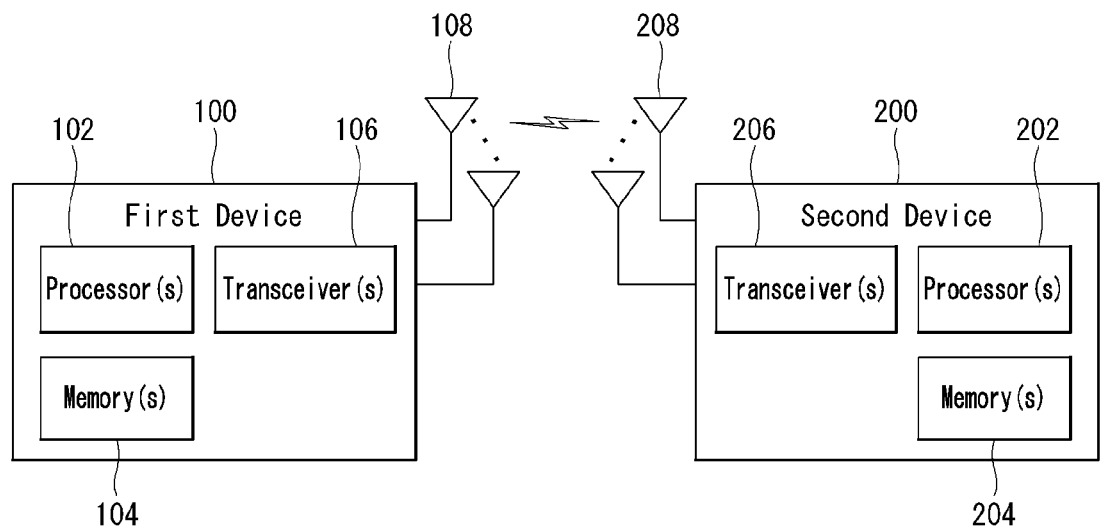

[FIG. 20]
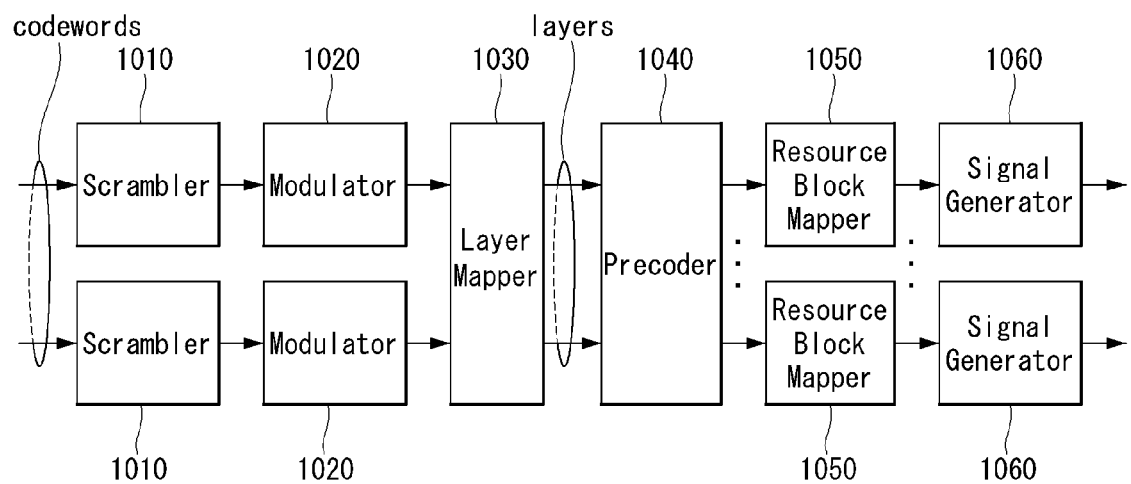
[FIG. 21]
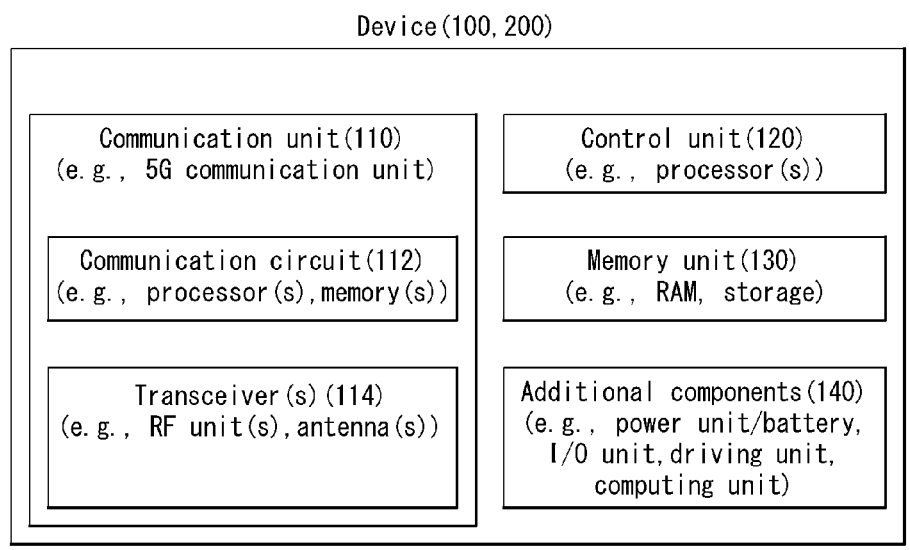

[FIG. 22]
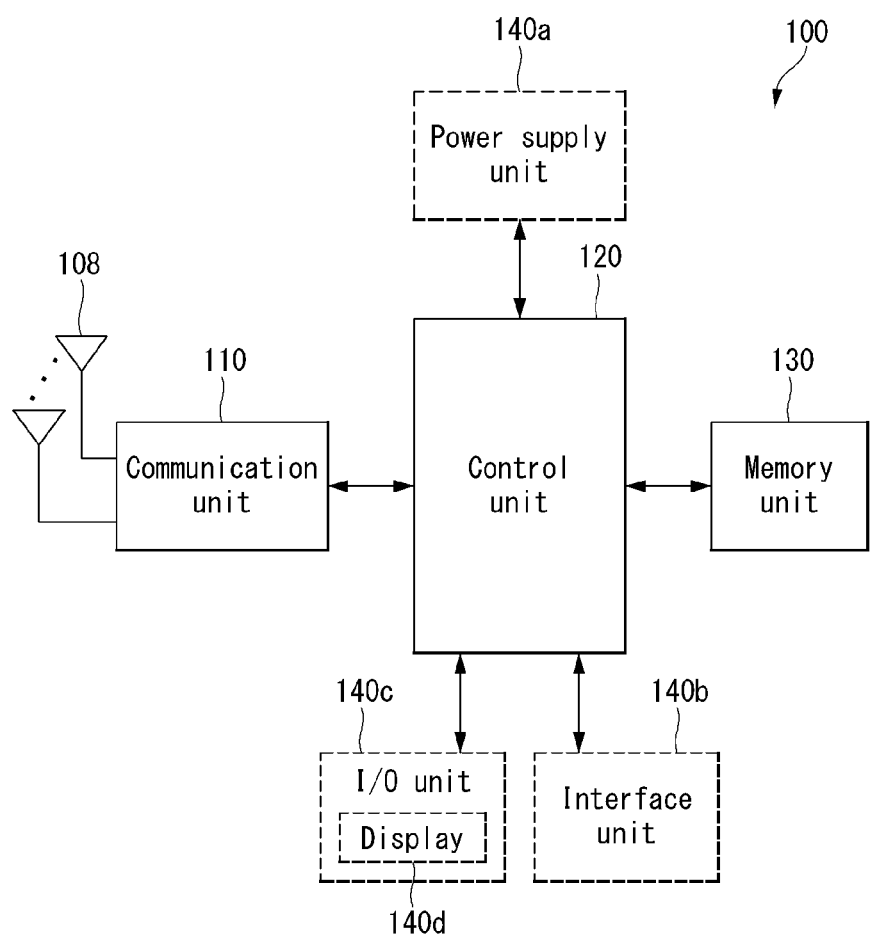

RESOURCE MAPPING METHOD FOR TRANSMISSION AND RECEPTION OF DATA IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2019/014768, filed on Nov. 1, 2019, which claims the benefit of U.S. Provisional application No. 62/755,324, filed on Nov. 2, 2018. The disclosures of the prior application are incorporated by reference in their entirety.

TECHNICAL FIELD

The present disclosure relates to a wireless communication system, and more specifically, to a resource mapping method for transmitting and receiving data by a user equipment (UE) supported by multiple transmission points (TPs), and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a resource mapping method for transmitting and receiving data by a user equipment (UE) supported by multiple transmission points (TPs) in a wireless communication system.

Specifically, when the multiple TPs transmit data to the UE in a non-coherent joint transmission (NCJT) method, the present disclosure proposes a resource mapping method that can be applied when resource regions scheduled by each TP are partially overlapped.

In addition, the present disclosure proposes a resource mapping method for optimizing/minimizing retransmission in consideration of a transmission (reception) unit of data.

In addition, the present disclosure proposes a method of finding a resource region in which the NCJT is performed through blind detection when some of control information transmitted by each TP is not received.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method for receiving data by a user equipment (UE) supported by a first apparatus and a second apparatus in a wireless communication system according to an embodiment of the present disclosure, the method includes receiving first control information from the first apparatus and second control information from the second apparatus; obtaining resource allocation information by decoding the first control information and the second control information; and receiving the data from at least one of the first apparatus and the second apparatus based on the resource allocation information, wherein the resource allocation information includes information on resource regions including (i) a first resource region commonly allocated from the first apparatus and the second apparatus and (ii) a second resource region allocated from one of the first apparatus or the second apparatus, and wherein the data is mapped to at least one of the first resource region or the second resource region based on a resource mapping order configured based on a transmission unit of the data.

In addition, in the method according to an embodiment of the present disclosure, the transmission unit of the data may be one of a code block, a code block group, or a transmission block.

In addition, in the method according to an embodiment of the present disclosure, when the transmission unit of the data is the code block or the code block group, the data may be mapped in order of a layer, a frequency domain of the first resource region, a time domain of the first resource region, and the second resource region.

In addition, in the method according to an embodiment of the present disclosure, when the transmission unit of the data is the transmission block, the data may be mapped in order of a layer, order of the first resource region and the second resource region, a frequency domain, and a time domain.

In addition, in the method according to an embodiment of the present disclosure, resources of the first resource region and resources of the second resource region may be mapped to each other at a ratio of one-to-one.

In addition, in the method according to an embodiment of the present disclosure, resources of the first resource region and resources of the second resource region may be mapped to each other at a ratio of 1 to N.

In addition, in the method according to an embodiment of the present disclosure, the N value may be calculated based on a number of resource blocks in the first resource region and a number of resource blocks in the second resource region.

In addition, in the method according to an embodiment of the present disclosure, physical resource blocks (PRBs) of the first resource region and the second resource region may be intersected to be mapped to a virtual resource block (VRB).

In addition, in the method according to an embodiment of the present disclosure, when the transmission unit of the data is the transmission block, the first control information and the second control information may include at least one of a rank to be applied to the transmission block, a demodulation reference signal (DMRS) port, or a modulation and coding scheme (MCS).

In addition, in the method according to an embodiment of the present disclosure, the first control information may include a specific value used when reception of the second control information fails.

In addition, in the method according to an embodiment of the present disclosure, the method may further include performing blind detection on resource blocks corresponding to a multiple of the specific value in a resource region allocated based on the first control information when the reception of the second control information fails.

In addition, in the method according to an embodiment of the present disclosure, the blind detection may be performed from resource blocks having a low resource block index in the resource region allocated based on the first control information.

A user equipment (UE) supported by a first apparatus and a second apparatus in a wireless communication system according to an embodiment of the present disclosure, the UE includes one or more transceivers; one or more processors; and one or more memories that store instructions for operations executed by the one or more processors, and are connected to the one or more processors, wherein the operations includes: receiving first control information from the first apparatus and second control information from the second apparatus; obtaining resource allocation information by decoding the first control information and the second control information; and receiving the data from at least one of the first apparatus and the second apparatus based on the resource allocation information, wherein the resource allocation information includes information on resource regions including (i) a first resource region commonly allocated from the first apparatus and the second apparatus and (ii) a second resource region allocated from one of the first apparatus or the second apparatus, and wherein the data is mapped to at least one of the first resource region or the second resource region based on a resource mapping order configured based on a transmission unit of the data.

In addition, in the UE according to an embodiment of the present disclosure, when the transmission unit of the data is a code block or a code block group, the data may be mapped in order of a layer, a frequency domain of the first resource region, a time domain of the first resource region, and the second resource region.

An apparatus comprising one or more memories and one or more processors functionally connected to the one or more memories according to an embodiment of the present disclosure, the one or more processors control the apparatus to: store first control information received from a first apparatus and second control information received from a second apparatus in the one or more memories, and obtain resource allocation information by decoding the first control information and the second control information, and receive the data from at least one of the first apparatus and the second apparatus based on the resource allocation information, wherein the resource allocation information includes information on resource regions including (i) a first resource region commonly allocated from the first apparatus and the second apparatus and (ii) a second resource region allocated from one of the first apparatus or the second apparatus, and wherein the data is mapped to at least one of the first resource region or the second resource region based on a resource mapping order configured based on a transmission unit of the data.

Advantageous Effects

According to an embodiment of the present disclosure, when multiple TPs transmit data to the UE in a non-coherent joint transmission (NCJT) method, in case that resource regions scheduled by each TP partially overlap, data retransmission can be optimized/minimized by mapping resources in consideration of the transmission (reception) unit of data.

In addition, according to an embodiment of the present disclosure, even if the UE fails to receive control information (e.g. DCI) from some of the multiple TPs operating in the NCJT method, the resource region in which NCJT is performed can be predicted/found through blind detection.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a diagram illustrating an example of a downlink transmission and reception operation.

FIG. 8 is a diagram illustrating an example of an uplink transmission and reception operation.

FIG. 9 is an example in which NCJT is performed in a partially overlapped time-frequency resource region.

FIG. 10 illustrates an example of resource element (RE) mapping when PDSCH1 is divided into two code blocks (CB) and transmitted.

FIG. 11 illustrates an example of RE mapping to which a method proposed in the present disclosure can be applied.

FIG. 12 illustrates an example of RE mapping when PDSCH1 is divided into four CBs and transmitted.

FIG. 13 illustrates an example of a RE mapping method in consideration of transmission of a TB unit proposed in the present disclosure.

FIG. 14 illustrates an example of RE mapping (or RB mapping) based on mapping a PRB to VRB to which a method proposed in the present disclosure can be applied.

FIG. 15 illustrates an example of mapping PRBs to VRBs when the number of RBs in is the overlapped region is greater than or equal to the number of RBs in the non-overlapped case.

FIG. 16 illustrates an example of a signaling procedure for performing data transmission and reception between a network side and a UE in the context of multiple TPs to which methods and/or embodiments proposed in the present disclosure can be applied.

FIG. 17 illustrates an example of an operation flowchart of a UE performing data transmission and reception to which methods and/or embodiments proposed in the present disclosure can be applied.

FIG. 18 illustrates a communication system 1 applied to the present disclosure.

FIG. 19 illustrates wireless devices applicable to the present disclosure.

FIG. 20 illustrates a signal processing circuit for a transmission signal.

FIG. 21 illustrates another example of a wireless device applied to the present s disclosure.

FIG. 22 illustrates a portable device applied to the present disclosure.

MODE FOR INVENTION

Adetailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR(Augmented Reality) device, VR(Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR(Augmented Reality) device, VR(Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability io so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected.

Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap t he benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f / 100) \cdot T_s=10$ ms. The radio frame is composed of ten subframes each having a section of $T_{sf}=(\Delta f^{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{subframe}^{slots, \mu}-1\}$ within a radio frame. One slot consists of consecutive OFDM symbols of $N_{symb}^\mu$, and $N_{symb}^\mu$ determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology P and the antenna port p is called a resource element and is uniquely identified by an index pair (k,l), where k=0, . . . , $N_{RB}^{\mu}N_{sc}^{RB}-1$ is an index on a frequency domain, l=0, . . . ,$2^{\mu}N_{symb}^{(\mu)}-1$ refers to a location of a symbol in a subframe. The index pair (k,l) is used to refer to a resource element in a slot, where l=0, . . . ,$N_{symb}^{\mu}-1$.

The resource element (k,l) for the numerology μ and the antenna port p corresponds to a complex value $\alpha_{k,l}^{(p,\mu)}$. When there is no risk for confusion or when a specific antenna port or numerology is not specified, the indices p and μ may be dropped, and as a result, the complex value may be $\alpha_{k,l}^{(p)}$ or $\alpha_{k,l}$.

Further, a physical resource block is defined as $N_{sc}^{RB}=12$ consecutive subcarriers in is the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{PB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP.

A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

DL and UL Transmission and Reception Operation

DL Transmission and Reception Operation

FIG. 7 is a diagram illustrating an example of a downlink transmission and reception operation.

Referring to the FIG. 7, the eNB schedules downlink transmission such as a frequency/time resource, a transport layer, a downlink precoder, MCS, etc., (S701). In particular, the eNB may determine a beam for PDSCH transmission to the UE through the aforementioned beam management operations. The UE receives Downlink Control Information (DCI) for downlink scheduling (i.e., including scheduling information of the PDSCH) on the PDCCH (S702). DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization, etc In particular, according to each state indicated in an antenna port(s) field, the number of DMRS ports may be scheduled, and single-user (SU)/Multi-user (MU) transmission scheduling is also available. Further, a TCI field is configured with 3 bits, and a maximum of 8 TCI states are indicated according to a TCI field value to dynamically the QCL for the DMRS. The UE receives downlink data from the eNB on the PDSCH (S703). When the UE detects a PDCCH including the DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23 } is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCS field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

A transport block may be configured with one or more code block groups (CBGs). One CBG may be configured with one or more code blocks (CBs). Furthermore, in the NR system, data transmission and reception in a CB/CBG unit may be possible in addition to data transmission and reception in a transport block unit. Accordingly, ACK/NACK transmission and retransmission in a CB/CBG unit may be possible. A UE may receive information on a CB/CBG from a base station through DCI (e.g., DCI format 0_1 or DCI format 1_1). Furthermore, the UE may receive information on a data transmission unit (e.g., TB/CB/CBG) from the base station.

UL Transmission and Reception Operation

FIG. 8 is a diagram illustrating an example of an uplink transmission and reception operation.

Referring to the FIG. 8, the eNB schedules uplink transmission such as the frequency/time resource, the transport layer, an uplink precoder, the MCS, etc., (S801). In particular, the eNB may determine a beam for PUSCH transmission of the UE through the aforementioned beam management operations. The UE receives DCI for downlink scheduling (i.e., including scheduling information of the PUSCH) on the PDCCH (S802). DCI format 0_0 or 0_1 may be used for the uplink scheduling and in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE transmits the uplink data to the eNB on the PUSCH (S803). When the UE detects a PDCCH including DCI format 0_0 or 0_1, the UE transmits the corresponding PUSCH according to the indication by the corresponding DCI. Two transmission schemes, i.e., codebook based transmission and non-codebook based transmission are supported for PUSCH transmission.

When higher layer parameter "txConfig" is set to "codebook", the UE is configured to the codebook based transmission. On the contrary, when higher layer parameter "txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The above descriptions may be used/applied to describe the method and/or embodiments proposed in the present disclosure. In the present disclosure, '/' may mean that all the contents separated by/are included (and) or only some of the separated contents are included (or). In addition, in the present disclosure, the following terms are used in unified terms for convenience of description. However, these terms do not limit the scope of the present disclosure.

TP: Transmission Point (TP may be replaced by terms such as base station, TRP, panel, etc.)
UE: User Equipment
CoMP: Coordinated Multi-Point
QCL: Quasi-co-location
Rx: Reception
Tx: Transmission
PDSCH: Physical Downlink Shared Channel
DMRS: DeModulation Reference Signal
DCI: Downlink Control Information
CB: Code Block
RE: Resource Element
RB: Resource Block
MIMO: Multi-Input Multi-Output As coordinated multi-point transmission and reception, that is, coordinated multi point (CoMP) (hereinafter, CoMP) technique is a technology in which multiple transmission points (TP) cooperate to communicate, a plurality of base stations exchange each other (e.g. using an X2 interface) or utilize channel information (e.g. RI/CQI/PMI/LI, etc.) received from the UE, cooperatively transmit to the UE, thereby effectively controlling interference. In addition, since two or more TPs operate as CoMP, it is possible to improve the transmission efficiency. As an example, in a mobile communication network, CoMP may be used to improve transmission quality for a UE at the boundary of a cell. CoMP technology for improving the UE and system performance includes operation scenarios such as joint transmission (JT) of the multiple TPs, coordinated scheduling (CS), coordinated beamforming (CB), and dynamic port selection (DPS).

CoMP joint transmission includes a non-coherent joint transmission (NCJT) method in which each of multiple TPs transmits an independent layer and a coherent joint transmission method in which TPs partially or entirely transmit a common (same) layer. In the present disclosure, transmitting and receiving a layer may mean transmitting and receiving data and/or a stream through the layer.

Non-Coherent Joint Transmission (NCJT) (hereinafter, NCJT) is a method in which the multiple TPs transmit data to one UE using the same time-frequency resource, and may transmit data through an independent (different) layer using different DMRS ports between the TPs.

The TP that transmits data in the NCJT method may transmit scheduling information for data transmission (reception) to the UE through downlink control information (DCI). In this case, a method of delivering, by each TP participating in the NCJT, scheduling information for data transmitted by itself via DCI is referred to as a multi DCI based NCJT, and a method in which one TP among the multiple TPs participating in NCJT delivers scheduling information for the data transmitted by itself and data transmitted by other TP(s) via one DCI is referred to as a single DCI based NCJT.

The NCJT may be divided into a NCJT method in which time-frequency resources through which each TP transmits data are independent, that is, non-overlapped, a NCJT method in which time-frequency resources are fully overlapped, or a NCJT method in which time-frequency resources are partially overlapped. For example, it is assumed that two TPs (e.g. TP1 and TP2) operate as NCJTs. At this time, in the case of the NCJT method in which time-frequency resources are partially overlapped, two TPs (e.g. TP1 and TP2) can transmit data in some resources where time-frequency resources are overlapped, and only one of the two TPs (e.g. TP1 or TP2) can transmit data in the remaining non-overlapped time-frequency resources.

Hereinafter, in the present disclosure, for convenience of description, it is assumed s that two TPs perform CoMP joint transmission, and layers transmitted by each TP are independent (different) layers. That is, it is assumed that two TPs operate in the NCJT method. In addition, in the present disclosure, it is assumed that the time-frequency resources are partially overlapped and the NCJT operates. In addition, it is assumed that an ideal backhaul is configured between the TPs. However, the above assumptions are only for convenience of description and do not limit the scope of the present disclosure. Therefore, it may be extended and applied even when three or more TPs perform CoMP joint transmission, and it may be extended and applicable to coherent joint transmission in which each TP transmits a common (same) layer as well as an independent layer.

In addition, for convenience of description, in order to distinguish multiple TPs/multiple UEs/data (e.g. PDSCH) transmitted by each TP, it will be represented using numbers. As an example, the multiple TPs may be expressed as TP1, TP2, etc., UEs may be expressed as UE1, UE2, etc., and PDSCHs transmitted by each TP may be expressed as PDSCH1, PDSCH2, PDSCH3, etc. The above numbers are only randomly allocated to distinguish each object, and do not limit the scope of the present disclosure.

FIG. 9 is an example in which NCJT is performed in a partially overlapped time-frequency resource region. FIG. 9 is for convenience of description and does not limit the scope of the present disclosure. The number of resources constituting RB group A and RB group B shown in FIG. 9 is an example, and it goes without saying that each RB group may be composed of a different number of resources than that shown in FIG. 9.

Referring to FIG. 9, TP1 may transmit data (e.g. PDSCH1) to UE1 through the RB group A and the RB group B. TP2 may transmit data (e.g. PDSCH2) to the UE1 through the RB group A, and may transmit data (e.g. PDSCH3) to UE2 through the RB group B. In other words, the UE1 may receive data (e.g. PDSCH1 and PDSCH2) from the TP1 and the TP2 in the NCJT method in the RB group A, receive data (e.g. PDSCH1) only from the TP1 in the RB group B, and receive inter-cell interference (ICI) from the TP2.

As shown in FIG. 9, from the viewpoint of the UE1, the time-frequency resource in which data is received may be divided into a partially overlapped region (i.e. a region where NCJT is performed) and a non-overlapped region (i.e. a region that receives data from one TP). For example, a partially overlapped resource region may be represented by RB group A (i.e. RBG A), and a non-overlapped resource region may be represented by RB group B (i.e. RBG B). The RB group A (i.e. RBG A) and the RB group B (i.e. RBG B) are concepts is distinguished from the resource block group (RBG) of the NR standard. Hereinafter, unless otherwise specified, the RBG may mean an RB group divided into a partially overlapped resource region in which NCJT is performed and a non-overlapped resource region in which data is transmitted by a single TP. The RBG of the conventional NR standard is divided into legacy RBG or RBG of the NR standard and expressed.

In FIG. 9, when UE1 receives PDSCH1 from TP1 through RBG A and RBG B, strong interference may be received in the RBG A and relatively weak interference may be received in the RBG B. Specifically, when UE1 receives PDSCH1 from TP1, PDSCH2 transmitted from TP2 to UE1 exists in RBG A, and single user (SU)-MIMO inter-layer interference may be received from PDSCH2. The SU-MIMO inter-layer interference may act as strong interference when receiving PDSCH1 because the channel is strong from TP2 and optimized beamforming is applied to the downlink channel from TP2 to UE1. On the other hand, in RBG B, TP2 may receive inter-cell interference from PDSCH3 transmitted to UE2. PDSCH3 may not cause significant interference to UE1 because optimized beamforming is applied to the downlink channel from TP2 to UE2. (If coordinated scheduling/coordinated beamforming is applied, since beamforming is applied to PDSCH3 to give small interference to UE1 and transmitted to UE2, small interference may occur to UE1.)

FIG. 10 illustrates an example of resource element (RE) mapping when PDSCH1 is divided into two code blocks (CB) and transmitted. FIG. 10 is for convenience of description and does not limit the scope of the present disclosure. The number of resources constituting RB group A and RB group B shown in FIG. 10 is an example, and it goes without saying that each RB group may be composed of a different number of resources than that shown in FIG. 10. FIG. 10 is an example of applying the RE mapping method of the current NR standard, according to the NR standard, RE mapping of PDSCH1 may be performed in the order of i) a layer, ii) a frequency domain, and iii) a time domain. Each CB (i.e. CB1 and CB2) may be distributed and mapped to both RBG A and RBG B, and may receive both inter-layer interference from PDSCH2 and (conventional) inter-cell interference from PDSCH3.

As a result, the quality of the channels/interferences of CB1 and CB2 may be similar. This characteristic may be inefficient when HARQ-ACK information (e.g., Acknowledgment (ACK)/Negative-Acknowledgement (NACK), etc.) is reported to the TP in units of code blocks (CB) or code block groups (CB group, CBG). Because, when the quality of the channel/interference is different for each CB, the UE may report ACK/NACK in a CB or CBG unit. Specifically, for CBs having good channel/interference quality, the UE may report ACK after successful decoding, and for CBs having bad channel/interference quality, the UE may report NACK after decoding failure, thereby minimizing/optimizing data retransmission. However, since the RE mapping according to the conventional method is similar in quality of channel/interference of CBs, it may not be possible to optimize ACK/NACK reporting in the CB or CBG unit.

In order to solve the above-described RE mapping problem, when the transmission (reception) unit of data is the CB or CBG unit, a new RE mapping order may be considered. Instead of following the order of the conventional RE mapping order i) a layer, ii) a frequency domain, iii) a time domain, a method of mapping the order of i) a layer, ii) a frequency domain within RB group (RBG), iii) a time domain, iv) a RB group (RBG) may be considered. In one RBG, it may be mapped in the order of the frequency domain and the time domain, and after the RE mapping in one RBG is completed, the RE mapping may be performed in the order of the frequency domain and the time domain in another RBG.

FIG. 11 illustrates an example of RE mapping to which a method proposed in the present disclosure can be applied. FIG. 11 is for convenience of description and does not limit the scope of the present disclosure. The number of resources constituting RB group A and RB group B shown in FIG. 11 is an example, and it goes without saying that each RB group may be composed of a different number of resources than that shown in FIG. 11. Referring to FIG. 11, a time-frequency resource region may be divided into RBG A, which is an RB group in which NCJT is performed, and RBG B, which is an RB group in which single TP transmission is performed. Here, according to the above-described proposed method, RE mapping may be performed in the order of i) a layer, ii) a frequency domain within RB group (RGB), iii) a time domain, iv) a RB group (RBG).

Specifically, for convenience of description, it is assumed that rank=1, that is, the case where the layer is 1. However, the assumption of the number of layers does not limit the technical scope of the present disclosure, and it is, of course, applicable to a plurality of layers. If data is mapped to RE in the order of i) frequency domain, ii) time domain in RBG A, and data mapping is completed to RE of RBG A, data may be mapped to RE in the order of i) frequency domain and ii) time domain in RBG B. (Or data may be mapped from RBG B and mapped to RBG A.) For example, the order in which RE mapping is to be performed from which RBG may be configured by the base station, or may be configured/defined in advance between the UE and the base station.

When the transmission (reception) unit of data is the CB or CBG unit, by performing RE mapping based on the above-described proposed method, since HARQ-ACK information can be fed back in consideration of characteristics of different channel/interference quality for each CB, retransmission can be minimized/optimized.

FIG. 12 illustrates an example of RE mapping when PDSCH1 is divided into four CBs (e.g. CB1, CB2, CB3, and CB4) and transmitted. For convenience of description, FIG. 12 illustrates an example in which resources in the frequency domain are sufficiently allocated compared to the size of the CB and thus resources of the time domain per each CB can be allocated in one symbol. FIG. 12 is for convenience of description and does not limit the scope of the present disclosure. The number of resources constituting RB group A and RB group B shown in FIG. 12 is an example, and it goes without saying that each RB group may be composed of a different number of resources than that shown in FIG. 12.

Referring to FIG. 12, PDSCH1 may be mapped to RE in the order of i) a layer, ii) a frequency domain, and iii) a time domain based on the RE mapping method of the current NR standard as described above. Each code block (e.g. CB1 to CB4) may be localized to RBG A or RBG B and may be a RE mapping, and one CB may receive only inter-layer interference from PDSCH2 or only (conventional) inter-cell interference from PDSCH3. In FIG. 12, CB1 and CB3 may only receive inter-layer interference from PDSCH2, and CB2 and CB4 may only receive inter-cell interference from PDSCH3. As a result, the quality of channel/interference that CB1 and CB2 experience may be different. Likewise, the quality of channel/interference that CB3 and CB4 experience may be different.

As shown in FIG. 12, characteristics of different quality of channel/interference that each code block experiences may be inefficient when HARQ-ACK information (e.g. ACK/NACK) is reported to the TP in a transport block (TB) unit (hereinafter, TB). Because, if the quality of channel/interference is different for each CB, since CBs that experience poor quality have a high probability of failing to decode, and report NACK for TB due to CBs that fail to decode, it may not be possible to minimize/optimize retransmissions. Therefore, in this case, ensuring the similar quality of channels/interferences between CBs constituting one TB may be advantageous in reducing the probability of transmitting NACK for TB.

In order to solve the above-described RE mapping problem in data transmission in the TB unit, a new RE mapping order may be considered.

FIG. 13 is an example of a proposal for solving the problem of the RE mapping described in FIG. 12. FIG. 13 illustrates an example of a RE mapping method in consideration of transmission of a TB unit proposed in the present disclosure. For convenience of description, FIG. 13 illustrates an example in which resources in the frequency domain are sufficiently allocated compared to the size of the CB and thus resources in the time domain per each CB can be allocated in one symbol. FIG. 13 is for convenience of description and does not limit the scope of the present disclosure. The number of resources constituting RB group A and RB group B shown in FIG. 13 is an example, and it goes without saying that each RB group may be composed of a different number of resources than that shown in FIG. 13. As described above, instead of following the order of the conventional RE mapping order of i) a layer, ii) a frequency domain, iii) a time domain, a method of mapping the order of i) a layer, ii) an RB group (RBG), iii) a frequency domain, iv) a time domain may be considered.

Specifically, for convenience of description, it is assumed that rank=1, that is, the case where the layer is 1. However, the assumption of the number of layers does not limit the technical scope of the present disclosure, and it is, of course, applicable to a plurality of layers. Referring to FIG. 21, a time-frequency resource region may be divided into RBG A, which is an RB group in which NCJT is performed, and RBG B, which is an RB group in which single TP transmission is performed. Here, according to the above-described proposed method, RE mapping may be performed in the order of i) a layer, ii) an RB group (RB group), iii) a frequency domain, iv) a time domain. That is, the RE mapping may be performed in the order that PDSCH1 is mapped to subcarrier (SC) 1 of RBG A, PDSCH1 is mapped to subcarrier (SC) 1 of RBG B, PDSCH1 is again mapped to subcarrier (SC) 2 of RBG A, and PDSCH1 is mapped to subcarrier (SC) 2 of RBG B. After mapping for all REs of one OFDM symbol, RE mapping may be performed in the same manner for the next OFDM symbol.

In the above-described method, an example in which data is mapped to RE by intersecting (alternatingly) the RBG of the partially overlapped resource region and the RBG of the non-overlapped resource region at a ratio of 1:1 has been described, but data may be mapped to RE by intersecting (alternatingly) at a ratio of 1:N. For example, assuming that RE mapping is performed at a ratio of 1:2, the RE mapping may be performed in the order that PDSCH1 is mapped to subcarrier (SC) 1 of RBG A, PDSCH1 is mapped to subcarrier (SC) 1,2 of RBG B, PDSCH1 is again mapped to subcarrier (SC) 2 of RBG A, and PDSCH1 is mapped to subcarrier (SC) 3,4 of RBG B. For the above-described operation, after mapping (changing) a physical resource block (RB) (i.e. PRB) to a virtual RB (i.e. VRB), the RE mapping (or RB mapping) may be performed in the order of a layer, a frequency domain, and a time domain in the VRB.

FIG. 14 illustrates an example of RE mapping (or RB mapping) based on mapping a PRB to VRB to which a method proposed in the present disclosure can be applied. FIG. 14 illustrates an example of a method of uniformly mixing the RBG (e.g. RBG A) to which NJCT is applied and the RBG (e.g. RBG B) to which the NJCT is not applied through the mapping from PRB to VRB as possible in the RB level. FIG. 14 is for convenience of description and does not limit the scope of the present disclosure.

Referring to FIG. 14, it can be assumed that RBG A is composed of N RBs, and RBG B is composed of M RBs. For example, here M may correspond to a value of N or more. For example, the ratio of RBs belonging to RBG A to RBG B is 1:floor (M/N), and PRBs may be mapped to VRBs. Here, the decimal point floor operation is only an example for convenience of description, and does not limit the technical scope of the present disclosure. Therefore, it is applicable not only to the decimal point floor operation, but also to the decimal point ceiling operation, and it is obvious that a similar effect can be obtained by the decimal point ceiling operation. In addition, resource mapping is described in an RB unit for convenience of description, but this is only an example and does not limit the technical scope of the present disclosure. Therefore, it may be applicable to units of RE or units of other resource sets.

As a specific example, when N=2 and M=10, 5 RBs of RBG B intersect each RB of RBG A, so that PRBs may be mapped to VRBs. (At this time, the frequency order of PRBs constituting the same RBG may be maintained the same even when mapped to VRB.)

As another example, when N=20, M=30, based on the ratio of 1:floor(M/N), one RB of RBG B may intersect for each RB of RBG A and be mapped to VRB. That is, RB of RBG A and RB of RBG B may be allocated one-to-one. At this time, since all PRBs of RBG A have already been mapped to VRB from the 41 st VRB, the remaining PRBs of RBG B may be mapped to VRB as they are. That is, since the 41 st to 50 th VRBs are composed of only RBs of PRG B, there may be a problem that RBG A and RBG B do not mix. Another way to solve this is to find the greatest common divisor K of N and M, and then instead of mapping PRB to VRB at a ratio of 1: floor (M/N) in the right figure of FIG. 14, it is also possible to map PRBs to VRBs in the ratio of (N/K):(M/K). As in the above example, when N=20 and M=30, since the greatest common divisor K=10, each RB belonging to RBG A and RBG B may be mapped to VRB in a ratio of 2:3.

In FIG. 14 described above, a method in which PRBs are mapped to VRBs has been described under the assumption that the number of RBs of RBG A is less than or equal to the number of RBs of RBG B. In contrast, when the number of RBs of RBG A is greater than or equal to the number of RBs of RBG B, a mapping (change) as shown in FIG. 15 may be considered.

FIG. 15 illustrates an example of mapping PRBs to VRBs when the number of RBs in the overlapped region is greater than or equal to the number of RBs in the non-overlapped case. FIG. 15 is for convenience of description and does not limit the scope of the present disclosure. Referring to FIG. 15, as in FIG. 14, it may be assumed that RBG A is composed of N RBs and RBG B is composed of M RBs. For example, here N may correspond to a value of M or more. For example, the ratio of RBs belonging to RBG A to RBG B is floor(N/M):1, and PRBs may be mapped to VRBs. That is, mixing by 1 RB unit in VRB becomes RBG B with less or equal number of RBs, and mixing by floor (N/M) units becomes RBG A with the same or greater number of RBs.

Considering FIGS. 14 and 15, the RB of the region with a small number of RBs is set to a ratio of 1, and the RB of the region with a large number of RBs is set to a ratio of N, resource mapping (e.g. RE mapping, RB mapping) may be performed so that resources of overlapped regions and resources of non-overlapped regions are uniformly intersected. In addition, in the above-described method of mapping a PRB to a VRB, it has been described based on mapping in RB units for convenience of description, but it is obvious that this can also be applied to the above-described RE unit mapping.

Meanwhile, a case in which one TP transmits two or more TBs to the UE may be considered. In this case, each TB may be transmitted by dividing it into an overlapped resource region (e.g. RBG A) and a non-overlapped resource region (e.g. RBG B) in the TB unit. For example, TP1 transmitting PDSCH1 may divide and transmit TB transmitted by RBG A and TB transmitted by RBG B, and may separately indicate rank/DMRS ports/modulation and coding scheme (MCS) to be applied to TB for each RBG through DCI. As a result, the TP may transmit data to the UE based on the optimal rank/DMRS ports/MCS suitable for the interference environment. The UE may be instructed separately for rank/DMRS ports/MCS to be applied to the TB for each RBG through DCI transmitted from TP1, and may decode the TB according to the instructed value.

As described above, in a multi DCI based NCJT operation, UE1 may receive DCI1, which is scheduling information corresponding to PDSCH1, and DCI2, which is scheduling information corresponding to PDSCH2, and may know the resource region in which NCJT is performed based on the DCI1 and the DCI2. In other words, the UE1 may decode DCI1 transmitted by TP1 and DCI2 transmitted by TP2 to identify an overlapped resource region in which NCJT is formed and a resource region supported (non-overlapped) by a single TP. If the UE1 receives DCI1 but fails to receive DCI2, it may not be able to accurately know the resource region (e.g. RBG A) in which NCJT is performed. To solve this, a method of detecting a region where NCJT occurs within RBs scheduled by one received DCI may be considered.

For example, it is possible to configure/define PDSCH2 to be received only in multiples of n consecutive RBs in an RB scheduled by DCI1. As a result, candidates of the receivable region of PDSCH2 may be limited within the RBs of PDSCH1, and UE1 may blindly detect the resource region (e.g. RBG A) in which NCJT is performed to find out the region in which the PDSCH2 is received even if DCI2 reception fails.

As a specific example, when PDSCH1 is transmitted from RB1 to RB10, when n=2, PDSCH 2 may be assumed to be transmitted within RBs of PDSCH1 with a size of 2, 4, 6, 8 or 10 RBs, which is a multiple of 2 consecutive RBs. In this case, RBs through which PDSCH2 is transmitted may be allocated from a low (or high) RB index. For example, when PDSCH2 is transmitted to two RBs, it may be transmitted to RB1 and RB2, and when transmitted to four RBs, it may be transmitted to RB1, RB2, RB3, and RB4. The n value may be indicated by the TP to the UE through RRC signaling or the like. Or a fixed value used only in the case of a partially overlapped time-frequency resource may be configure/defined. As another example, instead of the above n RBs, a method of using n NR standard RBGs (a group of a plurality of RBs defined in the standard, a concept different from RBG A and RBG B described in the present disclosure) may also be considered. As a result, since greater resource granularity is used, candidates for the receivable region of PDSCH2 may be further restricted, and the UE may perform blind detection to find out the region in which PDSCH2 is received.

The above-described proposed methods (FIGS. 9 to 15) of the present disclosure have been described based on the RE mapping of the PDSCH in a downlink CoMP environment, but this is for convenience of description and does not limit the technical scope of the present disclosure. Therefore, it goes without saying that it can be extended and utilized in RE mapping of PUSCH or RE mapping of non-data channels (e.g. PDCCH/PUCCH, etc.) in an uplink CoMP environment. In addition, the above-described methods proposed in the s present disclosure may be applied not only to RE mapping, but also to mapping of specific resource units. By performing resource mapping in consideration of the transmission unit of data through the above-described methods proposed in the present disclosure, it is possible to optimize/minimize the data retransmission probability.

FIG. 16 illustrates an example of a signaling procedure for performing data transmission and reception between a network side (e.g. TP1/TP2/base station) and a UE in the context of multiple TPs to which methods and/or embodiments proposed in the present disclosure can be applied. Here, the UE/network side is only an example, and may be replaced by various apparatuses as described in FIGS. 18 to 22 described later. In addition, the TP may be replaced by terms such as a base station, TRP, panel, or cell. FIG. 16 is merely for convenience of description and does not limit the scope of the present disclosure.

In addition, some of the step(s) shown in FIG. 16 may be omitted depending on circumstances and/or configurations.

Referring to FIG. 16, signaling between two TPs, that is, a first apparatus and a second apparatus (e.g. TP1 and TP2) and the UE, is considered for convenience of description, but it goes without saying that the signaling method may be extended and applied to signaling between the multiple TPs and the multiple UEs. In the following description, the network side may be one base station including the multiple TPs, and may be one cell including the multiple TPs. For example, an ideal/non-ideal backhaul may be configured between the first apparatus (e.g. TP1) and the second apparatus (e.g. TP2) constituting the network side. In addition, the following description is described based on the multiple TPs, but this may be extended and applied equally to transmission through a plurality of panels. In addition, in the present disclosure, an operation in which the UE receives a signal from the first apparatus/second apparatus (e.g. TP1 and TP2) may also be interpreted/described as an operation (or may be an operation) in which the UE receives a signal (through/using TP1/TP2) from the network side, and an operation in which the UE transmits a signal to the first apparatus/second apparatus (e.g. TP1 and TP2) may be interpreted/described as an operation (or may be an operation) in which the UE transmits a signal (through/using TP1/TP2) to the network side, and vice versa.

First, a corresponding signaling procedure will be described in terms of UE operation.

The UE may receive configuration information related to the data transmission and reception through/using the TP1 (and/or TP 2) from the network side (S1610). For example, the configuration information may be the configuration information related to the data transmission and reception based on a plurality of TRPs. The configuration information may include information related to the configuration (e.g. TP/TRP configuration) of the network side/resource allocation information related to the data transmission and reception based on the multiple TPs. In this case, the configuration information may be delivered through higher layer signaling (e.g. RRC signaling, MAC-CE, etc.). In addition, when the configuration information is predefined or configured, the corresponding step may be omitted.

For example, the operation in which the UE (100/200 in FIGS. 18 to 22) in step S1610 described above receives the configuration information related to the data transmission and reception from the network side (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to receive the configuration information related to the data transmission and reception, and one or more transceivers 106 may receive the configuration information related to data transmission and reception from the network side.

The UE may receive DCI1 and Data1 scheduled by the DCI1 through/using the TP1 from the network side (S1620-1). In addition, the UE may receive DCI2 and Data2 scheduled by the DCI2 through/using TP2 from the network side (S1620-2).

For example, the DCI1 may be first control information received from a first apparatus (e.g. TP1), and the DCI2 may be second control information received from a second apparatus (e.g. TP2). The first control information and the second control information may include information on a transmission (reception) unit of data. For example, the transmission (reception) unit of data may be configured as one of a code block (CB), a code block group (CBG), or a transmission block (TB). For example, the first control information and the second control information may include a specific value in case the UE does not receive the DCI transmitted by another TP. Or a fixed value used only in the case of a partially overlapped time-frequency resource may be configure/defined as the specific value. The specific value may be used for blind detection of the UE to find out a resource region in which NCJT occurs. As an example, the first control information may include a specific value for blind detection of the UE in case the reception of the second control information fails. For example, when the UE fails to receive the second control information, the UE may perform blind detection based on the specific value. As an example, blind detection for DATA2 may be performed within resource blocks corresponding to a multiple of the specific value in the resource region allocated by DCI1. In this case, resource allocation for DATA2 may be based on the index of the resource block. As an example, it may be assumed that it is allocated from a low (or high) resource block index.

For example, the UE may obtain resource allocation information for DATA1/DATA2 by decoding the DCI1 (e.g. first control information) and the DCI2 (e.g. second control information). The resource region allocated (scheduled) based on the DCI1 (e.g. first control information) and the resource region allocated (scheduled) based on the DCI2 (e.g. second control information) may include a partially overlapped first resource region and a non-overlapped (i.e. excluding the first resource region) second resource region. The resource allocation information may include information on resource regions including (i) a first resource region commonly allocated from the first apparatus and the second apparatus, that is, partially overlapped, and (ii) a second resource region allocated from one of the first apparatus or the second apparatus, that is, that is non-overlapped. For example, the resource allocation information may include information on a resource mapping order between resources of the first resource region and the second resource region and data. Here, the mapping of resources and data may be performed in a resource element (RE) unit or a resource block (RB) unit.

For example, the resource mapping order may be configured (determined) based on the transmission (reception) unit of data. For example, when the transmission (reception) unit of the data corresponds to the code block or the code block group, the resource mapping order may be configured (determined) in the order of a layer, a frequency domain of the first resource region, a time domain of the first resource region, a frequency domain of the second resource region, and a time domain of the second resource region. Here, the order of the first resource region and the second resource region may be configured in reverse. For example, when the transmission (reception) unit of the data corresponds to the transmission block, the resource mapping order may be configured (determined) in the order of a layer, order of the first resource region and the second resource region, a frequency domain, and a time domain.

As an example, when the transmission (reception) unit of the data corresponds to the transmission block, the resources of the first resource region and the resources of the second resource region may be intersected to be mapped at a ratio of one-to-one. As another example, the resources of the first resource region and the resources of the second resource region may be intersected to be mapped at a ratio of 1 to N. Here, the N value may be calculated based on the number of resource blocks in the first resource region and the number of resource blocks in the second resource region. For example, when intersecting and mapping are performed at a ratio of 1 to N, physical resource blocks of the first resource region and the second resource region may be intersected to be mapped to a virtual resource block.

For example, when the transmission (reception) unit of the data is the transmission block, the first control information and the second control information may include information on at least one of a rank, a demodulation reference signal (DMRS) port, or a modulation and coding scheme (MCS) to be applied to each transmission block.

The UE may receive the data (e.g. Data1, Data2) from at least one of the first apparatus or the second apparatus based on information related to the resource allocation. Specifically, data may be received only from the first apparatus, data may be received only from the second apparatus, or data may be received from the first apparatus and the second apparatus.

In addition, for example, DCI (e.g. DCI1, DCI2) and data (e.g. Data1, Data2) may be delivered through control channels (e.g. PDCCH, etc.) and data channels (e.g. PDSCH, etc.), respectively. For example, the data may be received by being mapped to the first resource region and/or the second resource region based on the resource mapping order configured based on the transmission unit of the data.

In addition, steps S1620-1 and S1620-2 may be performed at the same time, or one may be performed earlier than the other.

For example, the operation in which the UE (100/200 in FIGS. 18 to 22) in steps S1620-1/S1620-2 described above receives the DCI1 and/or the DCI2 and/or the Data1 and/or the Data2 from the network side (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to receive the DCI1 and/or the DCI2 and/or the Data1 and/or the Data2, and one or more transceivers 106 may receive the DCI1 and/or the DCI2 and/or the Data1 and/or the Data2 from the network side.

The UE may decode Data1 and Data2 received from TP1 and TP2 (S1630). For example, the UE may decode Data1 and Data2 based on the RE mapping method proposed in the present disclosure.

For example, the operation in which the UE (100/200 of FIGS. 18 to 22) in step S1630 described above decodes the Data1 and Data2 may be implemented by the apparatuses of FIGS. 18 to 22 to be described below. For example, referring to FIG. 19, one or more processors 102 may control one or more memories 104 to perform an operation of decoding Data1 and Data2.

The UE may transmit HARQ-ACK information (e.g. ACK information, NACK information, etc.) for the Data1 and/or Data2 to the network side through/using TP1 and/or TP2 (S1640-1, S1640-2). In this case, the HARQ-ACK information may be transmitted to each TP through each PUCCH. Alternatively, the HARQ-ACK information for Data1 and Data2 may be combined into one and transmitted to one PUCCH. In addition, the UE may be configured to transmit only HARQ-ACK information to a representative TP (e.g. TP1), and transmission of HARQ-ACK information to another TP (e.g. TP2) may be omitted. For example, the HARQ-ACK information may be transmitted corresponding to the transmission (reception) unit of the received data. For example, the HARQ-ACK information for data transmitted in units of the code block or the code block group may be transmitted in units of the code block or the code block group.

For example, the operation in which the UE (100/200 in FIGS. 18 to 22) in steps S1640-1/S1640-2 described above transmits the HARQ-ACK information for the Data1 and/or the Data2 to the network side (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to transmit the HARQ-ACK information for the Data1 and/or the Data2, and one or more transceivers 106 may transmit the HARQ-ACK information for the Data1 and/or the Data2 to the network side.

Next, a corresponding signaling procedure will be described in terms of network side operation.

The network side may transmit the configuration information related to the data transmission and reception through/using the TP1 (and/or TP 2) to the UE (S1610). For example, the configuration information may be the configuration information related to the data transmission and reception based on a plurality of TRPs. The configuration information may include information related to the configuration (e.g. TP/TRP configuration) of the network side/ resource allocation information related to the data transmission and reception based on the multiple TPs. In this case, the configuration information may be delivered through higher layer signaling (e.g. RRC signaling, MAC-CE, etc.). In addition, when the configuration information is predefined or configured, the corresponding step may be omitted.

For example, the operation in which the network side (100/200 in FIGS. 18 to 22) in step S1610 described above transmits the configuration information related to the data transmission and reception to the UE (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to transmit the configuration information related to the data transmission and reception, and one or more transceivers 106 may transmit the configuration information related to data transmission and reception from the network side.

The network side may transmit DCI1 and Data1 scheduled by the DCI1 through/using the TP1 to the UE (S1620-1). In addition, the network side may transmit DCI2 and Data2 scheduled by the DCI2 through/using TP2 to the UE (S1620-2).

For example, the DCI1 may be first control information transmitted by a first apparatus (e.g. TP1), and the DCI2 may be second control information transmitted by a second apparatus (e.g. TP2). The first control information and the second control information may include information on a transmission unit of data. For example, the transmission (reception) unit of data may be configured as one of a code block (CB), a code block group (CBG), or a transmission block (TB).

For example, the first control information and the second control information may include a specific value in case the UE does not receive the DCI transmitted by another TP. Or a fixed value used only in the case of a partially overlapped time-frequency resource may be configure/defined as the specific value. The specific value may be used for blind detection of the UE to find out a resource region in which NCJT occurs. As an example, the first control information may include a specific value for blind detection of the UE in case where the reception of the second control information fails.

For example, the resource region allocated based on the DCI1 (e.g. first control information) and the resource region allocated based on the DCI2 (e.g. second control information) may include a partially overlapped first resource region and a non-overlapped (i.e. excluding the first resource region) second resource region. The first control information and the second control information may include information related to resource allocation, and the information related to the resource allocation may include information on a mapping order of data and resources of the first resource region and the second resource region. Here, the data may be mapped to the resources in a resource element (RE) unit or a resource block (RB) unit.

For example, the resource mapping order may be configured (determined) based on the transmission (reception) unit of data. For example, when the transmission (reception) unit of the data is the code block or the code block group, the resource mapping order may be configured (determined) in the order of a layer, a frequency domain of the first resource region, a time domain of the first resource region, a frequency domain of the second resource region, and a time domain of the second resource region. Here, the order of the first resource region and the second resource region may be configured in reverse. For example, when the transmission (reception) unit of the data is the transmission block, the resource mapping order may be configured (determined) in the order of a layer, order of the first resource region and the second resource region, a frequency domain, and a time domain.

For example, when the transmission (reception) unit of the data is the transmission block, the resources of the first resource region and the resources of the second resource region may be intersected to be mapped at a ratio of one-to-one. As another example, the resources of the first resource region and the resources of the second resource region may be intersected to be mapped at a ratio of 1 to N. Here, the N value may be calculated based on the number of resource blocks in the first resource region and the number of resource blocks in the second resource region. For example, when intersecting and mapping are performed at a ratio of 1 to N, physical resource blocks of the first resource region and the second resource region may be intersected to be mapped to a virtual resource block.

For example, when the transmission (reception) unit of the data is the transmission block, the first control information and the second control information may include information on at least one of a rank, a demodulation reference signal (DMRS) port, or a modulation and coding scheme (MCS) to be applied to the transmission block.

The UE may receive the data (e.g. Data1, Data2) from at least one of the first apparatus or the second apparatus based on the resource allocation information.

In addition, for example, DCI (e.g. DCI1, DCI2) and data (e.g. Data1, Data2) may be delivered through control channels (e.g. PDCCH, etc.) and data channels (e.g. PDSCH, etc.), respectively. In addition, steps S1620-1 and S1620-2 may be performed at the same time, or one may be performed earlier than the other.

For example, the operation in which the network side (100/200 in FIGS. 18 to 22) in steps S1620-1/S1620-2 described above transmits the DCI1 and/or the DCI2 and/or the Data1 and/or the Data2 to the UE (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to transmit the DCI1 and/or the DCI2 and/or the Data1 and/or the Data2, and one or more transceivers 106 may transmit the DCI1 and/or the DCI2 and/or the Data1 and/or the Data2 to the UE.

The network side may receive HARQ-ACK information (e.g. ACK information, NACK information, etc.) for the Data1 and/or Data2 from the UE through/using TP1 and/or TP2 (S1640-1, S1640-2). In this case, each TP may receive the HARQ-ACK information through each PUCCH. Alternatively, the HARQ-ACK information for Data1 and Data2 may be combined into one and received to one PUCCH. In addition, it may be configured to receive only HARQ-ACK information to a representative TP (e.g. TP1), and reception of HARQ-ACK information to another TP (e.g. TP2) may be omitted. For example, the HARQ-ACK information may be transmitted corresponding to the transmission (reception) unit of received data. For example, the HARQ-ACK information for data transmitted in units of the code block or the code block group may be transmitted in units of the code block or the code block group.

For example, the operation in which the network side (100/200 in FIGS. 18 to 22) in steps S1640-1/S1640-2 described above receives the HARQ-ACK information for the Data1 and/or the Data2 from the UE (100/200 in FIGS. 18 to 22) by may be implemented by the apparatuses of FIGS. 18 to 22 to be described below. For example, referring to FIG. 19, one or more processors 102 may control one or more transceivers 106 and/or one or more memories 104 to receive the HARQ-ACK information for the Data1 and/or the Data2, and one or more transceivers 106 may receive the HARQ-ACK information for the Data1 and/or the Data2 from the UE.

FIG. 17 illustrates an example of an operation flowchart of a UE performing data transmission and reception to which methods and/or embodiments proposed in the present disclosure can be applied. FIG. 17 is merely for convenience of description and does not limit the scope of the present disclosure.

Referring to FIG. 17, it is assumed that the UE and/or the network side operates based on the above-described methods and/or embodiments (Here, the UE/base station is only an example, and may be substituted with various apparatuses as described in FIGS. 18 to 22 described later). Some of the steps described in FIG. 17 may be merged or omitted. In addition, in performing procedures described below, the DL-related operation of FIG. 7 may be considered/applied. In addition, in FIG. 17, it is assumed that the network side is composed of two apparatuses, that is, a first apparatus and a second apparatus (e.g. TP1 and TP2). However, this is only for convenience of description, does not limit the technical scope of the present disclosure, and it goes without saying that it can be operated even in an environment of a network side composed of a plurality of apparatuses. In addition, it is assumed that the UE receives data from the first apparatus and the second apparatus in the NCJT method.

The UE may receive first control information from the first apparatus and second control information from the second apparatus (S1710). For example, the first control information and the second control information may correspond to DCIs transmitted by each TP in a situation where the UE is supported by multiple TPs (e.g. TP1, TP2) (This may correspond to a situation in which multiple DCIs are received). For example, the first control information and the second control information may be received through a single DCI.

The first control information and the second control information may include information on a transmission unit of data. For example, the transmission (reception) unit of data may be configured as one of a code block (CB), a code block group (CBG), or a transmission block (TB). Each control information may include a specific value for blind detection of the UE in case where the reception of other control information fails. For example, the first control information may include a specific value for blind detection of the UE in case where the reception of the second control information fails. Or a fixed value used only in the case of a partially overlapped time-frequency resource may be configure/defined as the specific value.

For example, when the UE fails to receive the second control information, the UE may perform blind detection based on the specific value. As an example, blind detection for data (e.g. DATA2) transmitted from the second apparatus may be performed in resource blocks corresponding to a multiple of the specific value in the allocated resource region based on the first control information. In this case, resource allocation for data transmitted from the second apparatus may be based on the index of the resource block. As an example, it may be assumed that it is allocated from a low (or high) resource block index. Accordingly, the blind detection may be performed from resource blocks having the low resource block index in the resource region allocated based on the first control information. Alternatively, the blind detection may be performed in units of a resource block group (RBG of the NR standard) instead of the resource block (RB).

In addition, for example, when the transmission (reception) unit of the data is the transmission block, the first control information and the second control information may include at least one of a rank to be applied to the transmission block, a demodulation reference signal (DMRS) port, or a modulation and coding scheme (MCS).

For example, the operation in which the UE (100/200 in FIGS. 18 to 22) in step S1710 described above receives the first information from the first apparatus (100/200 in FIGS. 18 to 22) and the second information from the second apparatus (100/200 in FIGS. 18 to 22) may be implemented by the apparatuses of FIGS. 18 to 22 to be described below. For example, referring to FIG. 19, one or more processors 102 may control one or more transceivers 106 and/or one or more memories 104 to receive the first information and the second information, and one or more transceivers 106 may receive the first information from the first apparatus and the second information from the second apparatus.

The UE may obtain resource allocation information by decoding the first control information and the second control information (S1720). For example, the resource region allocated based on the first control information and the resource region allocated (scheduled) based on the second control information may include a partially overlapped first resource region and a non-overlapped (i.e. excluding the first resource region) second resource region. The resource allocation information may include information on resource regions including (i) a first resource region commonly allocated from the first apparatus and the second apparatus and (ii) a second resource region allocated from one of the first apparatus or the second apparatus. For example, the resource allocation information may include information on a resource mapping order between resources of the first resource region and the second resource region and data. Here, the mapping of resources and data may be performed in units of a resource element (RE) or a unit of a resource block (RB).

The data may be mapped to at least one of the first resource region or the second resource region based on the resource mapping order configured based on the transmission unit of the data. The resource mapping order may be configured (determined) based on the transmission (reception) unit of data. For example, when the transmission (reception) unit of the data is the code block or the code block group, the data may be mapped in the order of a layer, a frequency domain of the first resource region, a time domain of the first resource region, a frequency domain of the second resource region, and a time domain of the second resource region. Here, the order of the first resource region and the second resource region may be configured in reverse. For example, when the transmission (reception) unit of the data is the transmission block, the data may be mapped in the order of a layer, order of the s first resource region and the second resource region, a frequency domain, and a time domain.

For example, when the transmission (reception) unit of the data is the transmission block, the resources of the first resource region and the resources of the second resource region may be intersected to be mapped at a ratio of one-to-one. As another example, the resources of the first resource region and the resources of the second resource region may be intersected to be mapped at a ratio of 1 to N. Here, the N value may be calculated based on the number of resource blocks in the first resource region and the number of resource blocks in the second resource region.

For example, when intersecting and mapping are performed at a ratio of 1 to N, physical resource blocks (PRBs) of the first resource region and the second resource region may be intersected to be mapped to a virtual resource block (VRB). As a specific example, when the number of RBs of the first resource region is N and the number of RBs of the second resource region is M, the RB of the first resource region and the RB of the second resource region may be intersected to be mapped at a ratio of 1 to floor (M/N). Alternatively, it may be intersected at a ratio of floor (M/N):1. Here, the RB corresponding to 1 may correspond to a resource region with a smaller number of RBs. Alternatively, a ceiling operation may be performed instead of a floor operation. Alternatively, the PRBs may be mapped to the VRBs in a ratio of (N/K):(M/K) by obtaining the greatest common divisor K of M and N.

For example, the operation in which the UE (100/200 in FIGS. 18 to 22) in step S1720 described above obtains resource allocation information by decoding the first information and the second information may be implemented by the apparatuses of FIGS. 18 to 22 to be described below. For example, referring to FIG. 19, one or more processors 102 may control one or more transceivers 106 and/or one or more memories 104 to decode the first information and the second information.

The UE may receive the data (e.g. Data1, Data2) from at least one of the first apparatus or the second apparatus based on the resource allocation information (S1730). The data may be delivered through a downlink channel (e.g. PDSCH, PDCCH, etc.). For example, the UE may simultaneously receive data transmitted by the first apparatus and data transmitted by the second apparatus in the first resource region. In addition, the UE may receive only one of data transmitted by the first apparatus or data transmitted by the second apparatus in the second resource region.

For example, the data may be received based on one of the code block unit, the code block group unit, or the transmission block unit. The data may be received by being mapped to the first resource region and/or the second resource region based on the resource mapping order configured based on the transmission unit of the data.

For example, when two transmission blocks are received, one transmission block may be received in the first resource region and the other transmission block may be received in the second resource region. In this case, information on at least one of a rank to be applied to each transmission block, a demodulation reference signal (DMRS) port, or a modulation and coding scheme (MCS) may be separately indicated.

For example, the operation in which the UE (100/200 in FIGS. 18 to 22) in step S1730 described above receives data from at least one of the first apparatus (100/200 in FIGS. 18-22) or the second apparatus (100/200 in FIGS. 18-22) may be implemented by the apparatuses of FIGS. 18 to 22 to be described below. For example, referring to FIG. 19, one or more processors 102 may control one or more transceivers 106 and/or one or more memories 104 to receive the data, and one or more transceivers 106 may receive the data.

The UE may transmit HARQ-ACK information (e.g. ACK information, NACK information, etc.) for the data to the first apparatus and/or the second apparatus (S1740). In this case, the HARQ-ACK information may be transmitted to each of the first apparatus and the second apparatus through PUCCH, respectively. Alternatively, the HARQ-ACK information for data transmitted by the first apparatus and the second apparatus may be combined into one and transmitted to one PUCCH. In addition, the UE may be configured to transmit only HARQ-ACK information to a representative apparatus (e.g. the first apparatus, TP1), and transmission of the HARQ-ACK information to another apparatus (e.g. the second apparatus, TP2) may be omitted. For example, the HARQ-ACK information may be transmitted corresponding to the transmission (reception) unit of the received data. For example, the HARQ-ACK information for data transmitted in units of the code block or the code block group may be transmitted in units of the code block or the code block group. In some cases, step S1740 may be omitted.

For example, the operation in which the UE (100/200 in FIGS. 18 to 22) in step S1740 described above transmits the HARQ-ACK information for the data may be implemented by the apparatuses of FIGS. 18 to 22 to be described below. For example, referring to FIG. 19, one or more processors 102 may control one or more transceivers 106 and/or one or more memories 104 to transmit the HARQ-ACK information for the data, and one or more transceivers 106 may transmit the HARQ-ACK information for the data to the network side.

By performing resource mapping in consideration of the transmission (reception) unit of data through the above-described methods and embodiments, it is possible to optimize/minimize the data retransmission. In addition, the UE and/or the base station operating according to the above-described methods and embodiments, and the respective steps of FIGS. 16 and 17 may be specifically implemented by the apparatuses of FIGS. 18 to 22 to be described later. For example, the base station/network side may correspond to a first wireless apparatus, the UE may correspond to a second wireless apparatus, and the opposite case may be considered in some cases.

For example, the above-described network side/UE signaling and operation (e.g. FIGS. 16, 17, etc.) may be processed by one or more processors (e.g. 102, 202) of FIGS. 18 to 22, and the above-described network side/UE signaling and operation (e.g. FIGS. 16, 17, etc.) may be stored in a memory (e.g. one or more memories of FIGS. 18 to 22) (e.g. 104,204) in the form of a command/program (e.g. instruction, executable code) for driving at least one processor (e.g. 102, 202) of FIGS. 18 to 22.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system applied to the present disclosure.

Referring to FIG. 18, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f,* and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)).

The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 19 illustrates wireless devices applicable to the present disclosure.

Referring to FIG. '9, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document.

The one or more processors 102 and 202 may generate signals (e.g., baseband signals) including PDUs, SDUs, messages, control information, data, or information according to the descriptions, functions, procedures, proposals, methods, and/or operational flowcharts s disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to Which Present invention is Applied

FIG. 20 illustrates a signal processing circuit for a transmit signal.

Referring to FIG. 20, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 20 may be performed by the processors 102 and 202 and/or the transceivers 106 and 206 of FIG. 19. Hardware elements of FIG. 20 may be implemented in the processors 102 and 202 and/or the transceivers 106 and 206 of FIG. 19. For example, blocks 1010 to 1060 may be implemented in the processors 102 and 202 of FIG. 19. Further, blocks 1010 to 1050 may be implemented in the processors 102 and 202 of FIG. 19 and the block 1060 of FIG. 19 and the block 1060 may be implemented in the transceivers 106 and 206 of FIG. 19.

A codeword may be transformed into a radio signal via the signal processing circuit 1000 of FIG. 20. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform s precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 20. For example, the wireless device (e.g., 100 or 200 of FIG. 19) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 21 illustrates another example of a wireless device applied to the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 19. For example, the transceiver(s) 114 may include the one or more transceivers 106 and 106 and/or the one or more antennas 108 and 108 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Portable Device Example to Which Present invention is Applied FIG. 22 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 22, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100.

Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and is directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method for transmitting and receiving data in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for receiving data by a user equipment (UE) in a wireless communication system, the method comprising:
receiving first control information and second control information;
obtaining resource allocation information by decoding the first control information and the second control information; and
receiving at least one of (i) first data scheduled by the first control information or (ii) second data scheduled by the second control information, based on the resource allocation information,
wherein the resource allocation information includes information regarding resource regions including (i) a first resource region consisting of first time-frequency resources allocated by the first control information which are identical to second time-frequency resources allocated by the second control information and (ii) a second resource region consisting of third time-frequency resources allocated by one of the first control information or the second control information,
wherein the second resource region does not overlap with the first resource region, and
wherein at least one of the first data or the second data is mapped to at least one of the first resource region or the second resource region based on a resource mapping order configured based on a transmission unit of data.

2. The method of claim 1, wherein the transmission unit of the data is one of a code block, a code block group, or a transmission block.

3. The method of claim 2, wherein, based on the transmission unit of the data being the code block or the code block group, the data is mapped in order of a layer, a frequency domain of the first resource region, a time domain of the first resource region, and the second resource region.

4. The method of claim 2, wherein, based on the transmission unit of the data being the transmission block, at least one of the first data or the second data is mapped in order of a layer, order of the first resource region and the second resource region, a frequency domain, and a time domain.

5. The method of claim 4, wherein resources of the first resource region and resources of the second resource region are mapped to each other at a ratio of one-to-one.

6. The method of claim 4, wherein resources of the first resource region and resources of the second resource region are mapped to each other at a ratio of 1 to N.

7. The method of claim 6, wherein the N value is calculated based on a number of resource blocks in the first resource region and a number of resource blocks in the second resource region.

8. The method of claim 6, wherein physical resource blocks (PRBs) of the first resource region and the second resource region are intersected to be mapped to a virtual resource block (VRB).

9. The method of claim 2, wherein, based on the transmission unit of the data being the transmission block, the first control information and the second control information include at least one of a rank, a demodulation reference signal (DMRS) port, or a modulation and coding scheme (MCS), to be applied to the transmission block.

10. The method of claim 1, wherein the first control information includes a specific value used, based on reception of the second control information being failed.

11. The method of claim 10, further comprising:
performing blind detection on resource blocks corresponding to a multiple of the specific value in a resource region allocated based on the first control information based on the reception of the second control information being failed.

12. The method of claim 11, wherein the blind detection is performed from resource blocks having a low resource block index in the resource region allocated based on the first control information.

13. A user equipment (UE) configured to receive data in a wireless communication system, the UE comprising:
one or more transceivers;
one or more processors; and
one or more memories that store instructions, based on being executed by the one or more processors, configure the one or more processors to perform operations comprising:
receiving first control information and second control information;
obtaining resource allocation information by decoding the first control information and the second control information; and
receiving at least one of (i) first data scheduled by the first control information or (ii) second data scheduled by the second control information based on the resource allocation information,
wherein the resource allocation information includes information regarding resource regions including (i) a first resource region consisting of first time-frequency resources allocated by the first control information which are identical to second time-frequency resources allocated by the second control information and (ii) a second resource region consisting of third time-frequency resources allocated by one of the first control information or the second control information,
wherein the second resource region does not overlap with the first resource region, and
wherein at least one of the first data or the second data is mapped to at least one of the first resource region or the second resource region based on a resource mapping order configured based on a transmission unit of data.

14. The UE of claim 13, wherein, based on the transmission unit of the data being a code block or a code block group, at least one of the first data or the second data is mapped in order of a layer, a frequency domain of the first resource region, a time domain of the first resource region, and the second resource region.

15. An apparatus configured to operate in a wireless communication system, the apparatus comprising:
one or more memories storing instructions; and
one or more processors configured to execute the instructions to perform operations comprising:
receiving first control information and second control information;
obtaining resource allocation information by decoding the first control information and the second control information; and
receiving at least one of (i) first data scheduled by the first control information or (ii) second data scheduled by the second control information, based on the resource allocation information,
wherein the resource allocation information includes information regarding resource regions including (i) a first resource region consisting of first time-frequency resources allocated by the first control information which are identical to second time-frequency resources allocated by the second control information and (ii) a second resource region consisting of third time-frequency resources allocated by one of by the first control information or the second control information,
wherein the second resource region does not overlap with the first resource region, and
wherein at least one of the first data or the second data is mapped to at least one of the first resource region or the second resource region based on a resource mapping order configured based on a transmission unit of data.

* * * * *